US012531046B1

(12) United States Patent
Shankar et al.

(10) Patent No.: US 12,531,046 B1
(45) Date of Patent: Jan. 20, 2026

(54) NOISE REDUCTION AND RESIDUAL ECHO SUPPRESSION

(71) Applicant: Amazon Technologies, Inc., Seattle, WA (US)

(72) Inventors: Nikhil Shankar, Kirkland, WA (US); Amit Singh Chhetri, Sunnyvale, CA (US); Mrudula V Athi, North Natick, MA (US); Berkant Tacer, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 17/956,017

(22) Filed: Sep. 29, 2022

(51) Int. Cl.
*G10K 11/175* (2006.01)
*G10L 21/0208* (2013.01)

(52) U.S. Cl.
CPC ...... *G10K 11/1754* (2020.05); *G10L 21/0208* (2013.01); *G10L 2021/02082* (2013.01)

(58) Field of Classification Search
CPC ............ G10K 11/1754; G10L 21/0208; G10L 2021/02082
See application file for complete search history.

(56) References Cited

U.S. PATENT DOCUMENTS

| 11,189,297 | B1 * | 11/2021 | Nakagawa | H04R 3/02 |
| 11,521,635 | B1 * | 12/2022 | Chhetri | G06N 3/0455 |
| 11,539,833 | B1 * | 12/2022 | Nakagawa | H04R 3/02 |
| 11,646,009 | B1 * | 5/2023 | Chhetri | G10L 15/16 |
| | | | | 704/232 |
| 11,727,912 | B1 * | 8/2023 | Rao | G10L 21/0208 |
| | | | | 381/66 |
| 11,924,367 | B1 * | 3/2024 | Valin | G10L 25/18 |
| 2018/0226086 | A1 * | 8/2018 | Huang | G10L 21/0208 |
| 2019/0043491 | A1 * | 2/2019 | Kupryjanow | G10L 21/0208 |
| 2019/0394338 | A1 * | 12/2019 | Wada | H04B 3/23 |
| 2023/0096565 | A1 * | 3/2023 | Jia | G10L 21/0208 |
| | | | | 381/66 |
| 2023/0154480 | A1 * | 5/2023 | Xu | G06N 3/08 |
| | | | | 704/270 |

* cited by examiner

*Primary Examiner* — Michael N Opsasnick
(74) *Attorney, Agent, or Firm* — Pierce Atwood LLP

(57) ABSTRACT

A system configured to improve audio processing by performing dereverberation, noise reduction, and residual echo suppression during a communication session. The system may include a deep neural network (DNN) configured to jointly mitigate additive noise, reverberation, and residual echo. The DNN may be a convolutional recurrent network with dense connectivity (CRN-DC) and may be configured to process complex-valued spectrograms corresponding to the isolated audio data and/or estimated echo data generated by during echo cancellation. The DNN may generate a speech mask and/or an ambient noise mask, enabling the device to generate output audio data representing target speech and a variable amount of ambient noise. For example, the device may separately reconstruct the target speech using the speech mask and the background noise using the ambient noise mask, which enables the device to control the amount of ambient noise represented in the output audio data.

20 Claims, 13 Drawing Sheets

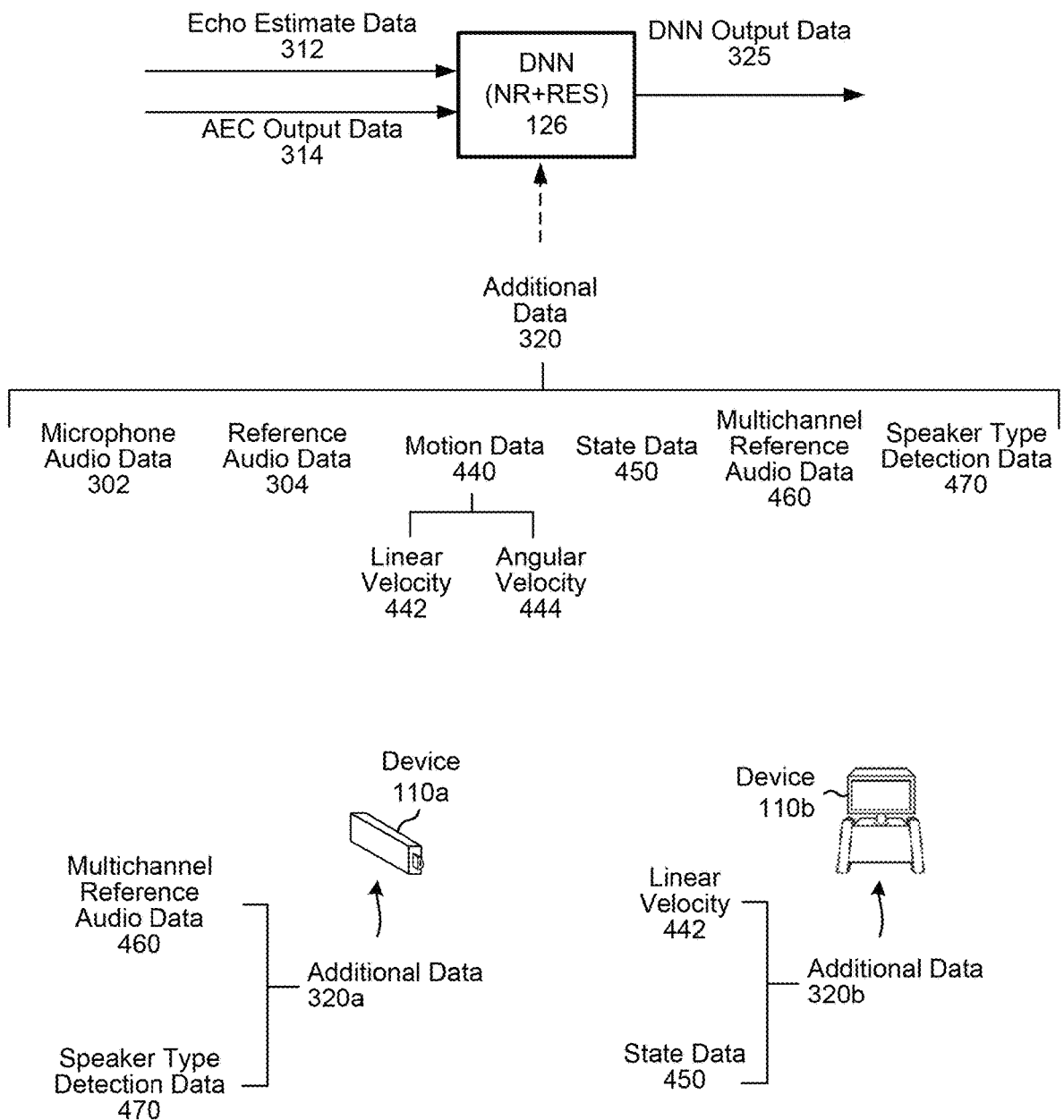

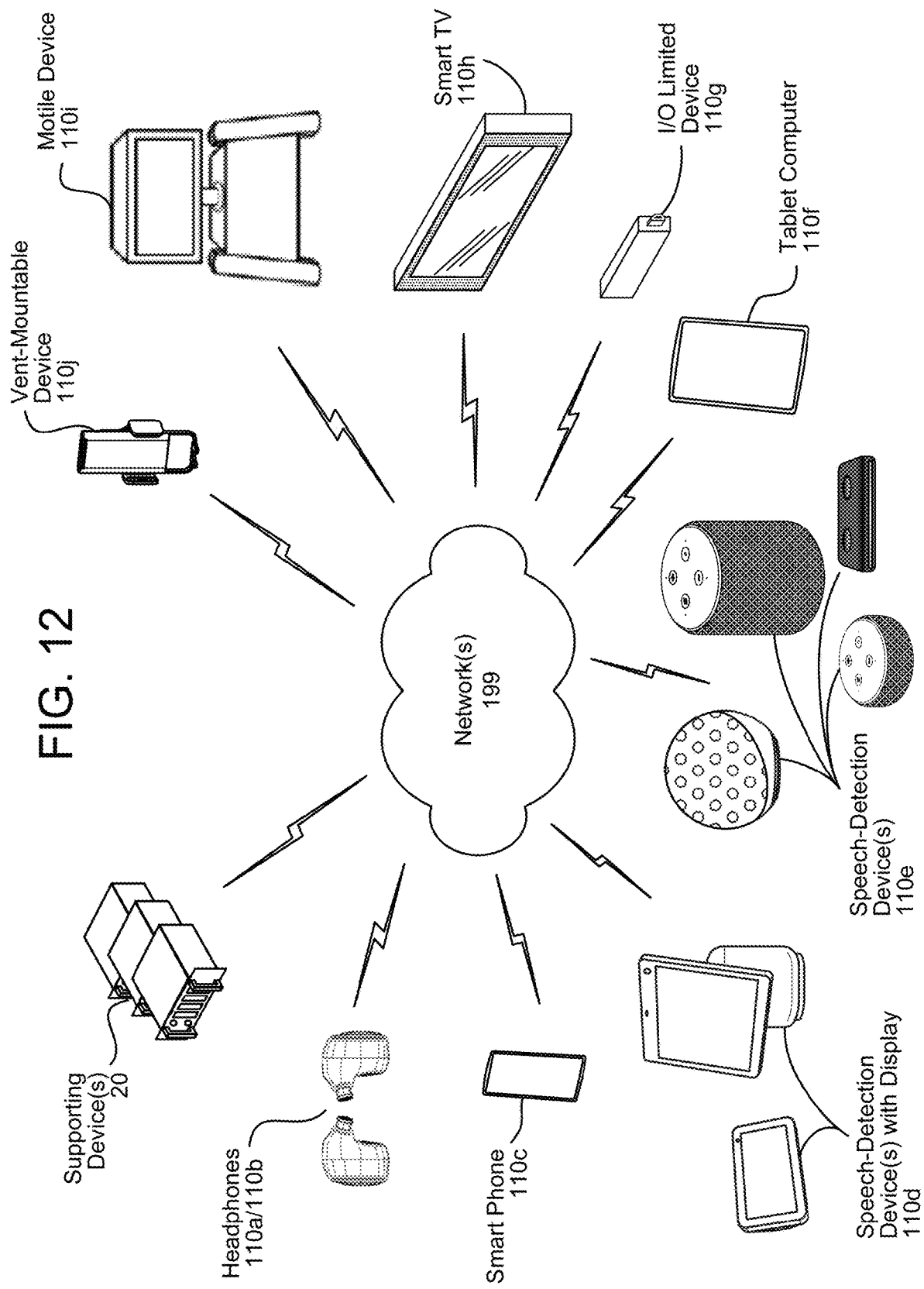

NOISE REDUCTION AND RESIDUAL ECHO SUPPRESSION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIGS. 4A-4B illustrates examples of input signals and auxiliary information according to embodiments of the present disclosure.

FIG. 12 illustrates an example of a computer network for use with the overall system, according to embodiments of the present disclosure.

DETAILED DESCRIPTION

Electronic devices may be used to capture and process audio data. The audio data may be used for voice commands and/or may be output by loudspeakers as part of a communication session. During a communication session, loudspeakers may generate audio using playback audio data while a microphone generates local audio data. An electronic device may perform audio processing, such as acoustic echo cancellation (AEC) processing, residual echo suppression, noise reduction, and/or the like, to remove audible noise and an "echo" signal corresponding to the playback audio data from the local audio data, isolating local speech to be used for voice commands and/or the communication session.

To improve an audio quality during voice communication, devices, systems and methods are disclosed that perform dereverberation, noise reduction, and residual echo suppression during a communication session. For example, a device may include a deep neural network (DNN) configured to jointly mitigate additive noise, reverberation, and residual echo. The DNN may be a convolutional recurrent network with dense connectivity (CRN-DC) and may be configured to process isolated audio data and estimated echo data generated by an AEC component during AEC processing. In some examples, the DNN may be configured to process complex-valued spectrograms corresponding to the isolated audio data and/or estimated echo data, as well as additional input data such as motion data, state data, speaker type detection data, and/or other audio signals (e.g., microphone audio data, playback audio data, etc.). The DNN may generate a speech mask and/or a noise mask, enabling the device to generate output audio data representing target speech and a variable amount of ambient noise. For example, the device may separately reconstruct the target speech (e.g., using the speech mask) and the background noise (e.g., using the noise mask), which enables the device to control the amount of ambient noise represented in the output audio data.

Figure 1:
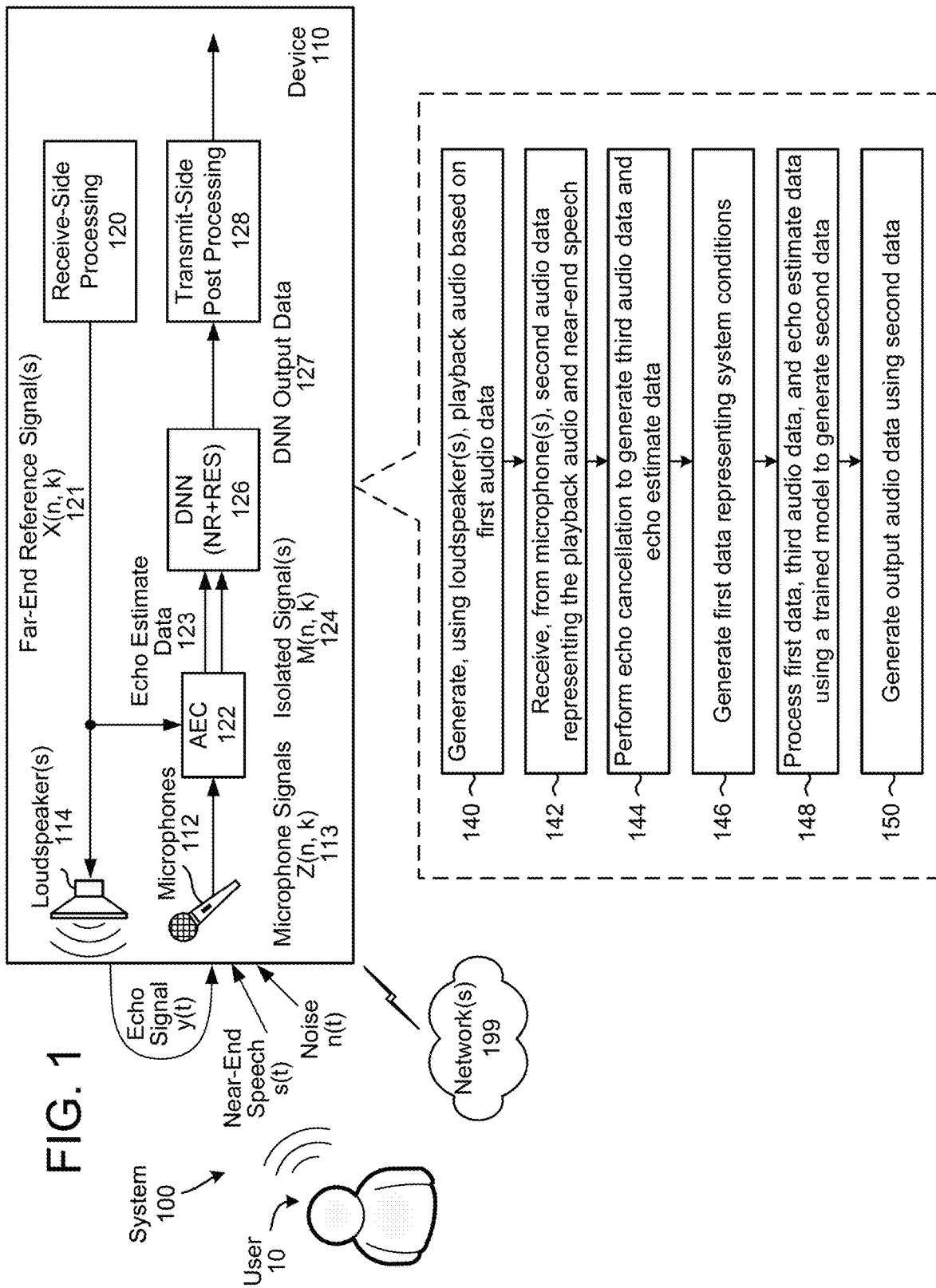
FIG. 1 illustrates a system configured to perform noise reduction and residual echo suppression within a voice processing pipeline according to embodiments of the present disclosure.

FIG. 1 illustrates a high-level conceptual block diagram of a system configured to perform noise reduction and residual echo suppression within a voice processing pipeline. As illustrated in FIG. 1, the system 100 may include a device 110 that may be communicatively coupled to network(s) 199 and may include one or more microphone(s) 112 in a microphone array and/or one or more loudspeaker(s) 114. However, the disclosure is not limited thereto and the device 110 may include additional components without departing from the disclosure.

The device 110 may be an electronic device configured to send audio data to and/or receive audio data. For example, the device 110 (e.g., near-end or local device) may receive playback audio data (e.g., far-end reference audio data, represented in FIG. 1 as far-end reference signal(s) X(n, k) 121) from a remote device and the playback audio data may include remote speech originating at the remote device. During a communication session, the device 110 may generate output audio corresponding to the playback audio data using the one or more loudspeaker(s) 114. While generating the output audio, the device 110 may capture microphone audio data (e.g., input audio data, represented in FIG. 1 as microphone signals Z(n, k) 113) using the one or more microphone(s) 112. In addition to capturing desired speech (e.g., the microphone audio data includes a representation of local speech from a user 10, represented in FIG. 1 as near-end speech s(t)), the device 110 may capture a portion of the output audio generated by the loudspeaker(s) 114 (including a portion of the remote speech), which may be referred to as an "echo" or echo signal y(t), along with additional acoustic noise n(t) (e.g., undesired speech, ambient acoustic noise in an environment around the device 110, etc.), as discussed in greater detail below.

For ease of illustration, some audio data may be referred to as a signal (e.g., audio signal), such as a far-end reference signal(s) x(t), an echo signal y(t), an echo estimate signal y'(t), microphone signals z(t), isolated signal(s) m(t) (e.g., error signal m(t)), and/or the like. However, the signals may be comprised of audio data and may be referred to as audio data (e.g., far-end reference audio data x(t), echo audio data y(t), echo estimate audio data y'(t), microphone audio data z(t), isolated audio data m(t), error audio data m(t), etc.) without departing from the disclosure.

As will be described in greater detail below with regard to FIGS. 2A-2C, an audio signal may be represented in the time domain (e.g., far-end reference signal(s) x(t)) or in a frequency/subband domain (e.g., far-end reference signal(s) X(n, k)) without departing from the disclosure. In some examples, audio signals generated by microphones 112, output to the loudspeaker(S) 114, and/or sent via network(s) 199 are time domain signals (e.g., x(t)), and the device 110 converts these time domain signals to the frequency/subband domain during audio processing. For ease of illustration, however, FIG. 1 represents the far-end reference signal(s) X(n, k), the microphone signals Z(n, k), and the output signal OUT(n, k) in the frequency/subband domain.

During a communication session, the device 110 may receive far-end reference signal(s) x(t) (e.g., playback audio data) from a remote device/remote server(s) via the network(s) 199 and may generate output audio (e.g., playback audio) based on the far-end reference signal(s) x(t) using the one or more loudspeaker(s) 114. Using one or more microphone(s) 112 in the microphone array, the device 110 may capture input audio as microphone signals z(t) (e.g., near-end reference audio data, input audio data, microphone audio data, etc.), may perform audio processing to the microphone signals z(t) to generate an output signal out(t) (e.g., output audio data), and may send the output signal out(t) to the remote device/remote server(s) via the network(s) 199.

In some examples, the device 110 may send the output signal out(t) to the remote device as part of a communication session. For example, the device 110 may send the output signal out(t) to the remote device either directly or via remote server(s) and may receive the far-end reference signal(s) x(t) from the remote device either directly or via the remote server(s). However, the disclosure is not limited thereto and in other examples, the device 110 may send the output signal out(t) to the remote server(s) in order for the remote server(s) to determine a voice command. For example, during a communication session the device 110 may receive the far-end reference signal(s) x(t) from the remote device and may generate the output audio based on the far-end reference signal(s) x(t). However, the microphone signal z(t) may be separate from the communication session and may include a voice command directed to the remote server(s).

In this example, the device 110 may send the output signal out(t) to the remote server(s) and the remote server(s) may determine a voice command represented in the output signal out(t) and may perform an action corresponding to the voice command (e.g., execute a command, send an instruction to the device 110 and/or other devices to execute the command, etc.). In some examples, to determine the voice command the remote server(s) may perform Automatic Speech Recognition (ASR) processing, Natural Language Understanding (NLU) processing and/or command processing. The voice commands may control the device 110, audio devices (e.g., play music over loudspeaker(s), capture audio using microphone(s), or the like), multimedia devices (e.g., play videos using a display, such as a television, computer, tablet or the like), smart home devices (e.g., change temperature controls, turn on/off lights, lock/unlock doors, etc.), or the like.

In audio systems, acoustic echo cancellation (AEC) processing refers to techniques that are used to recognize when a device has recaptured sound via microphone(s) after some delay that the device previously output via loudspeaker(s). The device may perform AEC processing by subtracting a delayed version of the original audio signal (e.g., far-end reference signal(s) X(n, k)) from the captured audio (e.g., microphone signal(s) Z(n, k)), producing a version of the captured audio that ideally eliminates the "echo" of the original audio signal, leaving only new audio information. For example, if someone were singing karaoke into a microphone while prerecorded music is output by a loudspeaker, AEC processing can be used to remove any of the recorded music from the audio captured by the microphone, allowing the singer's voice to be amplified and output without also reproducing a delayed "echo" of the original music. As another example, a media player that accepts voice commands via a microphone can use AEC processing to remove reproduced sounds corresponding to output media that are captured by the microphone, making it easier to process input voice commands.

The device 110 may perform audio processing to the microphone signals Z(n, k) to generate the output signal OUT(n, k). For example, the device 110 may process the microphone signal(s) Z(n, k) using a voice processing pipeline to improve an audio quality associated with the output signal OUT(n, k). As illustrated in FIG. 1, the voice processing pipeline may include an AEC component 122, a deep neural network (DNN) component 126, and transmit-side post processing component(s) 128. For example, the AEC component 122 may be configured to perform echo cancellation to isolate target speech captured by the microphone(s) 112, while the DNN component 126 may be configured to perform noise reduction (NR), residual echo suppression (RES), and/or dereverberation (DER) to reduce noise, suppress residual echo, and/or attenuate other undesired audio data (e.g., echoes and/or noise) to further enhance the target speech.

As illustrated in FIG. 1, the device 110 may receive audio data from a remote device, may process the audio data using receive-side processing components 120 to generate far-end reference signal(s) (e.g., playback audio data), and may generate playback audio (e.g., echo signal y(t)) using the loudspeaker(s) 114. While the device 110 may generate the playback audio using the far-end reference signal(s) x(t) in the time domain, for ease of illustration FIG. 1 represents the far-end reference signal(s) X(n, k) in the frequency/subband domain as the AEC component 122 performs echo cancellation in the subband domain. The far-end reference signal(s) may be referred to as far-end reference signal(s) (e.g., far-end reference audio data), playback signal(s) (e.g., playback audio data), and/or the like.

The one or more microphone(s) 112 in the microphone array may capture microphone signals (e.g., microphone audio data, near-end reference signals, input audio data, etc.), which may include the echo signal y(t) along with near-end speech s(t) from the user 10 and noise n(t). While the device 110 may generate the microphone signals z(t) in the time domain, for ease of illustration FIG. 1 represents the microphone signals Z(n, k) in the frequency/subband domain as the AEC component 122 performs echo cancellation in the subband domain.

To isolate the local speech (e.g., near-end speech s(t) from the user 10), the device 110 may include the AEC component 122, which may subtract a portion of the far-end reference signal(s) X(n, k) 121 from the microphone signal(s) Z(n, k) 113 and generate isolated signal(s) M(n, k) 124 (e.g., error signal(s)). As the AEC component 122 does not have access to the echo signal y(t) itself, the AEC component 122 and/or an additional component (not illustrated) may use the far-end reference signal(s) X(n, k) 121 to generate reference signal(s) (e.g., estimated echo signal(s)), which corresponds to the echo signal y(t) and is represented in FIG. 1 as echo estimate data 123. Thus, when the AEC component 122 removes the echo estimate data 123, the AEC component 122 is removing at least a portion of the echo signal y(t). Therefore, the output (e.g., isolated signal(s) M(n, k) 124) of the AEC component 122 may include the near-end speech s(t) along with portions of the echo signal y(t) and/or the noise n(t) (e.g., difference between the reference signal(s) and the actual echo signal y(t) and noise n(t)).

Room reverberation, additive noise, and residual echo are detrimental factors that may negatively impact audio quality. For example, the user 10 of the device 110 may establish a communication session with another device, where digitized speech signals are compressed, packetized, and transmitted via the network(s) 199. One technique for establishing the communication session involves Voice over Internet Protocol (VOIP), although the disclosure is not limited thereto. During the communication session, a large amount of residual echo, reverberation, and/or additive noise is harmful to communication (e.g., reduces an audio quality), as the reverberation lowers intelligibility and makes the speech sound "far" and "hollow."

To further improve an audio quality of the output signal, the device 110 may include the DNN component 126, which is configured to perform noise reduction, residual echo suppression, and/or dereverberation processing. For example, the DNN may process the echo estimate data 123 and the isolated signals M(n, k) 124 generated by the AEC component 122 to jointly mitigate additive noise, reverberation, and residual echo, as described in greater detail below with regard to FIGS. 3-6. Thus, the DNN component 126 may dynamically suppress unwanted audio data (e.g., the portions of the echo signal y(t) and the noise n(t) that were not removed by the AEC component 122) and generate DNN output data 127. As described in greater detail below, the DNN component 126 may be configured to process complex-valued spectrograms without departing from the disclosure.

As illustrated in FIG. 1, the device 110 may generate (140), using the loudspeaker(s) 114, playback audio based on first audio data (e.g., far-end reference signal(s)), may receive (142), from the microphone(s) 112, second audio data (e.g., microphone signals) representing the playback audio and near-end speech, and may perform (144) echo cancellation to generate third audio data (e.g., isolated signal(s)) and echo estimate data.

To illustrate an example, the AEC component 122 may perform AEC processing on the first microphone signal $Z_1(n, k)$ to generate a first isolated signal $M_1(n, k)$ associated with the first microphone 112a. For example, the AEC component 122 may generate a first echo estimate signal using a portion of the far-end reference signal(s) X(n, k), such that the first echo estimate signal approximates an echo signal corresponding to the far-end reference signal(s) that is represented in the first microphone signal. The AEC component 122 may then remove the first echo estimate signal from the first microphone signal $Z_1(n, k)$ to generate the first isolated signal $M_1(n, k)$.

As illustrated in FIG. 1, the device 110 may generate (146) first data representing system conditions of the device 110. For example, the first data may include motion data (e.g., linear velocity, angular velocity, speed of the device, and/or the like) associated with the device 110, a current state of the device 110, a type and/or number of external loudspeakers associated with the device 110, and/or the like.

The device 110 may process (148) the first data, the third audio data, and the echo estimate data using a trained model to generate second data, as described in greater detail below with regard to FIGS. 3-6. Finally, the device 110 may generate (150) output audio data using the second data. For example, the second data may correspond to speech mask data and the device 110 may use the speech mask data to generate the output audio data, which may represent enhanced target speech, although the disclosure is not limited thereto.

In some examples, the device 110 may operate using a microphone array comprising multiple microphones 112. For example, the device 110 may use three or more microphones 112 without departing from the disclosure. In some examples, the device 110 may select microphone pairs from a plurality of microphones 112 without departing from the disclosure. Additionally or alternatively, the device 110 may apply beamforming to generate a plurality of directional audio signals (e.g., beams) without departing from the disclosure. In audio systems, beamforming refers to techniques that are used to isolate audio from a particular direction in a multi-directional audio capture system. Beamforming may be particularly useful when filtering out noise from non-desired directions. Beamforming may be used for various tasks, including isolating voice commands to be executed by a speech-processing system.

One technique for beamforming involves boosting audio received from a desired direction while dampening audio received from a non-desired direction. In one example of a beamformer system, a fixed beamformer unit employs a filter-and-sum structure to boost an audio signal that originates from the desired direction (sometimes referred to as the look-direction) while largely attenuating audio signals that original from other directions. A fixed beamformer unit may effectively eliminate certain diffuse noise (e.g., undesirable audio), which is detectable in similar energies from various directions, but may be less effective in eliminating noise emanating from a single source in a particular non-desired direction. The beamformer unit may also incorporate an adaptive beamformer unit/noise canceller that can adaptively cancel noise from different directions depending on audio conditions.

As an alternative to performing acoustic echo cancellation using the far-end reference signal(s) X(n, k), in some examples the device 110 may generate a reference signal based on the beamforming. For example, the device 110 may use Adaptive Reference Algorithm (ARA) processing to generate an adaptive reference signal based on the microphone signal(s) Z(n, k). To illustrate an example, the ARA processing may perform beamforming using the microphone signal(s) Z(n, k) to generate a plurality of audio signals (e.g., beamformed audio data) corresponding to particular directions. For example, the plurality of audio signals may include a first audio signal corresponding to a first direction, a second audio signal corresponding to a second direction, a third audio signal corresponding to a third direction, and so on. The ARA processing may select the first audio signal as a target signal (e.g., the first audio signal includes a representation of speech) and the second audio signal as a reference signal (e.g., the second audio signal includes a representation of the echo and/or other acoustic noise) and may perform Adaptive Interference Cancellation (AIC) (e.g., adaptive acoustic interference cancellation) by removing the reference signal from the target signal. As the input audio data is not limited to the echo signal, the ARA processing may remove other acoustic noise represented in the input audio data in addition to removing the echo. Therefore, the ARA processing may be referred to as performing AIC, adaptive noise cancellation (ANC), AEC, and/or the like without departing from the disclosure.

In some examples, the device 110 may be configured to perform AIC using the ARA processing to isolate the speech in the microphone signal(s) Z(n, k). The device 110 may dynamically select target signal(s) and/or reference signal(s). Thus, the target signal(s) and/or the reference signal(s) may be continually changing over time based on speech, acoustic noise(s), ambient noise(s), and/or the like in an environment around the device 110. In some examples, the device 110 may select the target signal(s) based on signal quality metrics (e.g., signal-to-interference ratio (SIR) values, signal-to-noise ratio (SNR) values, average power values, etc.) differently based on current system conditions. For example, the device 110 may select target signal(s) having highest signal quality metrics during near-end single-talk conditions (e.g., to increase an amount of energy included in the target signal(s)), but select the target signal(s) having lowest signal quality metrics during far-end single-talk conditions (e.g., to decrease an amount of energy included in the target signal(s)).

In some examples, the device 110 may perform AIC processing without performing beamforming without departing from the disclosure. Instead, the device 110 may select target signals and/or reference signals from the microphone signal(s) Z(n, k) without performing beamforming. For example, a first microphone 112a may be positioned in proximity to the loudspeaker(s) 114 or other sources of acoustic noise while a second microphone 112b may be positioned in proximity to the user 10. Thus, the device 110 may select first microphone signal $Z_1(n, k)$ associated with the first microphone 112a as the reference signal and may select second microphone signal $Z_2(n, k)$ associated with the second microphone 112b as the target signal without departing from the disclosure. Additionally or alternatively, the device 110 may select the target signals and/or the reference signals from a combination of the beamformed audio data and the microphone signal(s) Z(n, k) without departing from the disclosure.

While FIG. 1 illustrates the loudspeaker(s) 114 being internal to the device 110, the disclosure is not limited thereto and the loudspeaker(s) 114 may be external to the device 110 without departing from the disclosure. For example, the device 110 may send the far-end reference signal(s) x(t) to the loudspeaker(s) 114 using a wireless protocol without departing from the disclosure. However, the disclosure is not limited thereto and the loudspeaker(s) 114 may be included in the device 110 and/or connected via a wired connection without departing from the disclosure. For example, the loudspeaker(s) 114 may correspond to a wireless loudspeaker, a television, an audio system, and/or the like connected to the device 110 using a wireless and/or wired connection without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., far-end reference audio data or playback audio data, microphone audio data, near-end reference data or input audio data, etc.) or audio signals (e.g., playback signal, far-end reference signal, microphone signal, near-end reference signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

As used herein, audio signals or audio data (e.g., far-end reference audio data, near-end reference audio data, microphone audio data, or the like) may correspond to a specific range of frequency bands. For example, far-end reference audio data and/or near-end reference audio data may correspond to a human hearing range (e.g., 20 Hz-20 kHz), although the disclosure is not limited thereto.

Far-end reference audio data (e.g., far-end reference signal(s) x(t)) corresponds to audio data that will be output by the loudspeaker(s) 114 to generate playback audio (e.g., echo signal y(t)). For example, the device 110 may stream music or output speech associated with a communication session (e.g., audio or video telecommunication). In some examples, the far-end reference audio data may be referred to as playback audio data, loudspeaker audio data, and/or the like without departing from the disclosure. For ease of illustration, the following description will refer to the playback audio data as far-end reference audio data. As noted above, the far-end reference audio data may be referred to as far-end reference signal(s) x(t) without departing from the disclosure. As described above, the far-end reference signal(s) may be represented in a time domain (e.g., x(t)) or a frequency/subband domain (e.g., X(n, k)) without departing from the disclosure.

Microphone audio data corresponds to audio data that is captured by the microphone(s) 112 prior to the device 110 performing audio processing such as AIC processing. The microphone audio data may include local speech s(t) (e.g., an utterance, such as near-end speech generated by the user 10), an "echo" signal y(t) (e.g., portion of the playback audio captured by the microphone(s) 112), acoustic noise n(t) (e.g., ambient noise in an environment around the device 110), and/or the like. As the microphone audio data is captured by the microphone(s) 112 and captures audio input to the device 110, the microphone audio data may be referred to as input audio data, near-end audio data, and/or the like without departing from the disclosure. For ease of illustration, the following description will refer to microphone audio data and near-end reference audio data interchangeably. As noted above, the near-end reference audio data/microphone audio data may be referred to as a near-end reference signal(s) or microphone signal(s) without departing from the disclosure. As described above, the microphone signals may be represented in a time domain (e.g., z(t)) or a frequency/subband domain (e.g., Z(n, k)) without departing from the disclosure.

An "echo" signal y(t) corresponds to a portion of the playback audio that reaches the microphone(s) 112 (e.g., portion of audible sound(s) output by the loudspeaker(s) 114 that is recaptured by the microphone(s) 112) and may be referred to as an echo or echo data y(t).

Output audio data corresponds to audio data after the device 110 performs audio processing (e.g., AIC processing, ANC processing, AEC processing, and/or the like) to isolate the local speech s(t). For example, the output audio data corresponds to the microphone audio data Z(n, k) after subtracting the reference signal(s) X(n, k) (e.g., using AEC component 122), optionally performing residual echo suppression (RES) (e.g., using the RES component), and/or other audio processing known to one of skill in the art. As noted above, the output audio data may be referred to as output audio signal(s) without departing from the disclosure. As described above, the output signal may be represented in a time domain (e.g., out(t)) or a frequency/subband domain (e.g., OUT(n, k)) without departing from the disclosure.

As illustrated in FIG. 1, the output of the AEC component may be represented as M(n, k) and may be referred to as isolated audio signal M(n, k), error audio data M(n, k), error signal M(n, k), and/or the like. Similarly, the output of the transmit side post processing component(s) 128 may be represented as OUT(n, k) and may be referred to as an output signal OUT(n, k).

For ease of illustration, the following description may refer to generating the output audio data by performing acoustic echo cancellation (AEC) processing, residual echo suppression (RES) processing, noise reduction (NR) processing, comfort noise generation (CNG) processing, dereverberation (DER) processing, and/or the like. However, the disclosure is not limited thereto, and the device 110 may generate the output audio data by performing AEC processing, AIC processing, RES processing, NR processing, CNG processing, DER processing, other audio processing, and/or a combination thereof without departing from the disclosure. Additionally or alternatively, the disclosure is not limited to AEC processing and, in addition to or instead of performing AEC processing, the device 110 may perform other processing to remove or reduce unwanted speech $s_2(t)$ (e.g., speech associated with a second user), unwanted acoustic noise n(t), and/or echo signals y(t), such as adaptive interference cancellation (AIC) processing, adaptive noise cancellation (ANC) processing, and/or the like without departing from the disclosure.

Figure 2A:
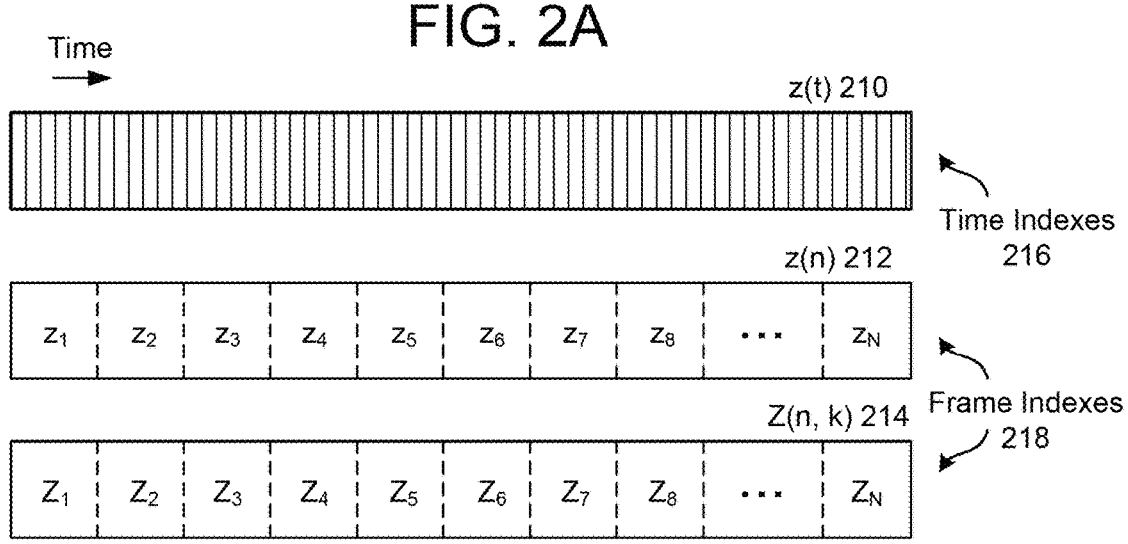
FIGS. 2A-2C illustrate examples of frame indexes, tone indexes, and channel indexes.
Figure 2B:
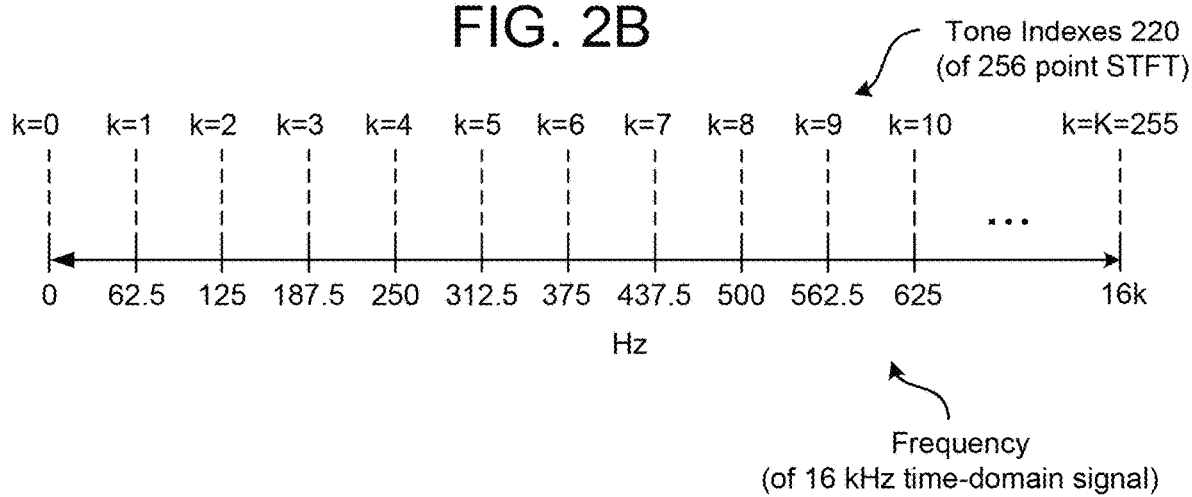
Figure 2C:
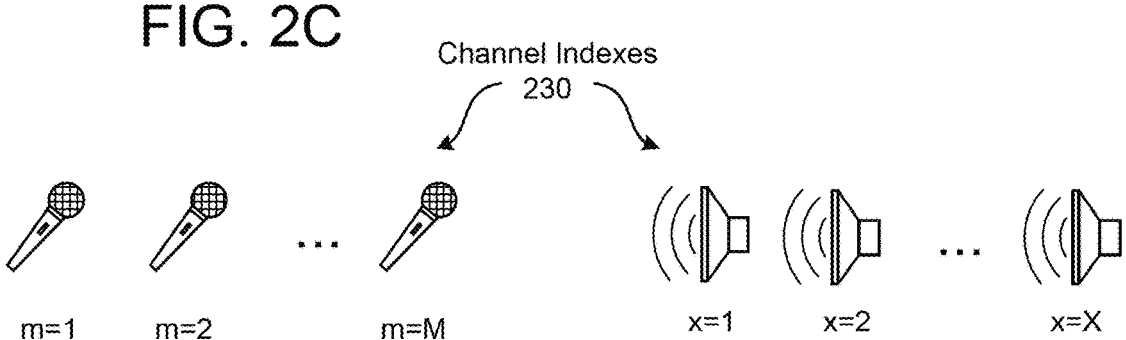

FIGS. 2A-2C illustrate examples of frame indexes, tone indexes, and channel indexes. As described above, the device 110 may generate microphone audio data z(t) using microphones 112. For example, a first microphone 112a may generate first microphone audio data $z_1(t)$ in a time domain, a second microphone 112b may generate second microphone audio data $z_2(t)$ in the time domain, and so on. As illustrated in FIG. 2A, a time domain signal may be represented as microphone audio data z(t) 210, which is comprised of a sequence of individual samples of audio data. Thus, z(t) denotes an individual sample that is associated with a time t.

While the microphone audio data z(t) 210 is comprised of a plurality of samples, in some examples the device 110 may group a plurality of samples and process them together. As illustrated in FIG. 2A, the device 110 may group a number of samples together in a frame (e.g., audio frame) to generate microphone audio data z(n) 212. As used herein, a variable z(n) corresponds to the time-domain signal and identifies an individual frame (e.g., fixed number of samples s) associated with a frame index n.

Additionally or alternatively, the device 110 may convert microphone audio data z(n) 212 from the time domain to the frequency domain or subband domain. For example, the device 110 may perform Discrete Fourier Transforms (DFTs) (e.g., Fast Fourier transforms (FFTs), short-time Fourier Transforms (STFTs), and/or the like) to generate microphone audio data Z(n, k) 214 in the frequency domain or the subband domain. As used herein, a variable Z(n, k) corresponds to the frequency-domain signal and identifies an individual frame associated with frame index n and tone index k. As illustrated in FIG. 2A, the microphone audio data z(t) 210 corresponds to time indexes 216, whereas the microphone audio data z(n) 212 and the microphone audio data Z(n, k) 214 corresponds to frame indexes 218.

While FIG. 2A illustrates examples of the device 110 converting between microphone audio data z(t) 210 (e.g., time domain signal comprising individual samples), microphone audio data z(n) 212 (e.g., time domain signal comprising audio frames), and microphone audio data Z(n, k) 214 (e.g., frequency domain or subband domain signal), the disclosure is not limited thereto and these concepts may be applied to other audio signals without departing from the disclosure. For example, the device 110 may convert between reference audio data x(t) (e.g., time domain signal comprising individual samples), reference audio data x(n) (e.g., time domain signal comprising audio frames), and reference audio data X(n, k) (e.g., frequency domain or subband domain signal) without departing from the disclosure. Similarly, the device 110 may generate an output signal OUT(n, k) in the frequency or subband domain and then convert to the time domain to generate output signal out (n) or out(t) without departing from the disclosure.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data Z (n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data z(t) 210) and frame indexes 218 (e.g., microphone audio data z(n) 212 in the time domain and microphone audio data Z(n, k) 216 in the frequency domain or subband domain). For example, the system 100 may apply FFT processing to the time-domain microphone audio data z(n) 212, producing the frequency-domain microphone audio data Z(n, k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 62.5 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 2B illustrates the frequency range being divided into 256 different subbands (e.g., tone indexes), the disclosure is not limited thereto and the system 100 may divide the frequency range into K different subbands or frequency bins (e.g., K indicates an FFT size) without departing from the disclosure. While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

The system 100 may include multiple microphones 112, with a first channel (m=1) corresponding to a first microphone 112a, a second channel (m=2) corresponding to a second microphone 112b, and so on until an M-th channel (m=M) that corresponds to microphone 112M. FIG. 2C illustrates channel indexes 230 including a plurality of channels from channel m1 to channel M. While many drawings illustrate two channels (e.g., two microphones 112), the disclosure is not limited thereto and the number of channels may vary. For the purposes of discussion, an example of system 100 includes "M" microphones 112 (M>1) for hands free near-end/far-end distant speech recognition applications.

Similarly, the system 100 may include multiple loudspeakers 114, with a first channel (x=1) corresponding to a first loudspeaker 114a, a second channel (x=2) corresponding to a second loudspeaker 114b, and so on until an X-th channel (x=X) that corresponds to loudspeaker 114X. FIG. 2C illustrates channel indexes 230 also including a plurality of reference channels from channel x1 to channel X. For ease of illustration, the following disclosure may refer to a single reference channel, but the disclosure is not limited thereto and the system 100 may modify the techniques described herein based on any number of reference channels without departing from the disclosure.

As described above, while FIG. 2A is described with reference to the microphone audio data z(t), the disclosure is not limited thereto and the same techniques apply to the playback audio data x(t) without departing from the disclosure. Thus, playback audio data x(t) indicates a specific time index t from a series of samples in the time-domain, playback audio data x(n) indicates a specific frame index n from series of frames in the time-domain, and playback audio data X(n, k) indicates a specific frame index n and frequency index k from a series of frames in the frequency-domain.

Prior to converting the microphone audio data z(n) and the playback audio data x(n) to the frequency-domain, the device 110 may first perform time-alignment to align the playback audio data x(n) with the microphone audio data z(n). For example, due to nonlinearities and variable delays associated with sending the playback audio data x(n) to the loudspeaker(s) 114 (e.g., especially if using a wireless connection), the playback audio data x(n) is not synchronized with the microphone audio data z(n). This lack of synchronization may be due to a propagation delay (e.g., fixed time delay) between the playback audio data x(n) and the microphone audio data z(n), clock jitter and/or clock skew (e.g., difference in sampling frequencies between the device 110 and the loudspeaker(s) 114), dropped packets (e.g., missing samples), and/or other variable delays.

To perform the time alignment, the device 110 may adjust the playback audio data x(n) to match the microphone audio data z(n). For example, the device 110 may adjust an offset between the playback audio data x(n) and the microphone audio data z(n) (e.g., adjust for propagation delay), may add/subtract samples and/or frames from the playback audio data x(n) (e.g., adjust for drift), and/or the like. In some examples, the device 110 may modify both the microphone audio data and the playback audio data in order to synchronize the microphone audio data and the playback audio data. However, performing nonlinear modifications to the microphone audio data results in first microphone audio data associated with a first microphone to no longer be synchronized with second microphone audio data associated with a second microphone. Thus, the device 110 may instead modify only the playback audio data so that the playback audio data is synchronized with the first microphone audio data.

As described above, room reverberation, additive noise, and residual echo are detrimental factors that negatively impact audio quality for hands-free voice communication systems. For example, a user 10 of a local device 110 may establish a communication session with another device, where digitized speech signals are compressed, packetized, and transmitted via the network(s) 199. One technique for establishing the communication session involves Voice over Internet Protocol (VOIP), although the disclosure is not limited thereto. During the communication session, a large amount of additive noise, reverberation, and/or residual echo is harmful to communication (e.g., reduces an audio quality), and the reverberation lowers intelligibility and makes the speech sound "far" and "hollow."

Figure 3:
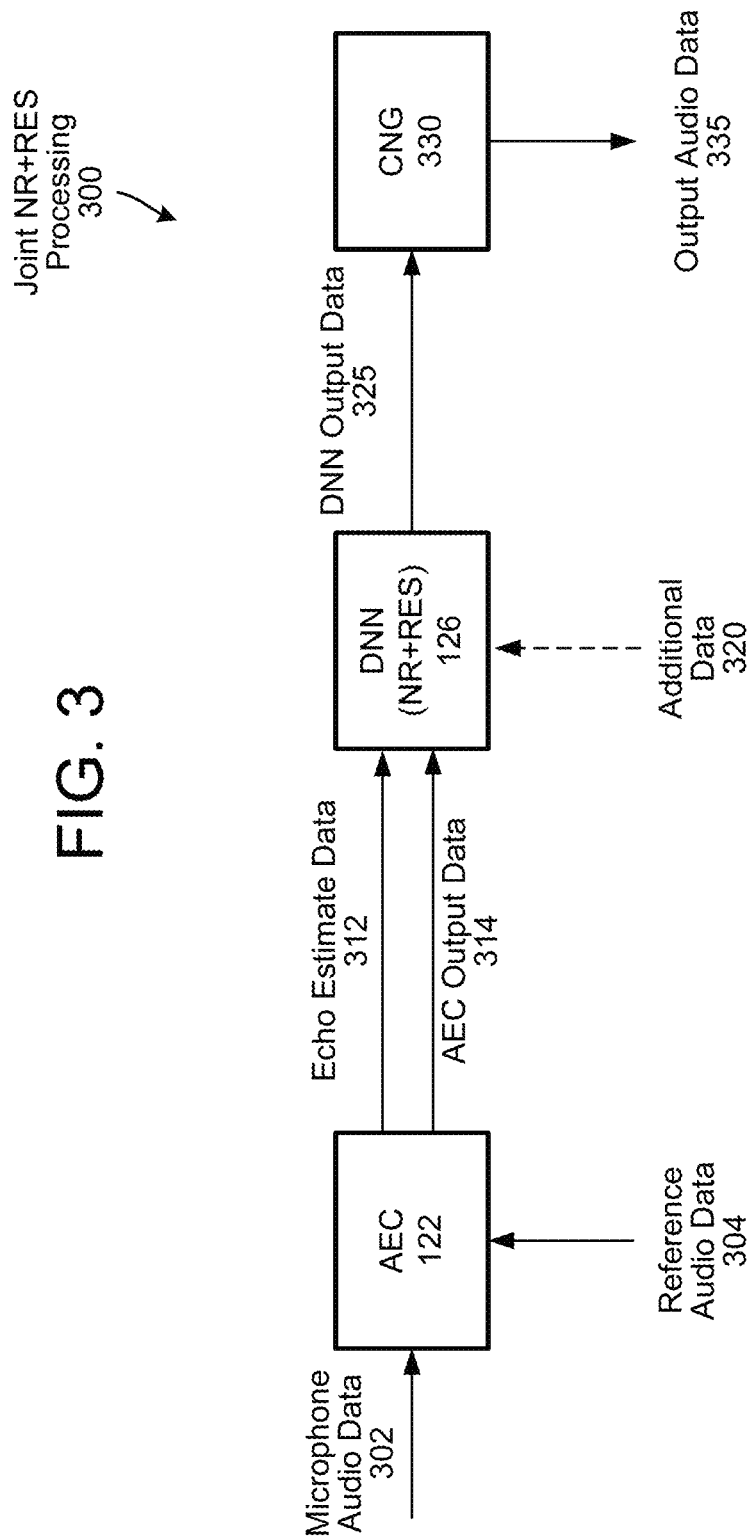
FIG. 3 illustrates an example component diagram for performing noise reduction and residual echo suppression within a voice processing pipeline according to examples of the present disclosure.

FIG. 3 illustrates an example component diagram for performing noise reduction and residual echo suppression within a voice processing pipeline according to examples of the present disclosure. As illustrated in FIG. 3, the device 110 may generate microphone audio data 302 using one or more microphones 112 and may perform signal processing to the microphone audio data 302 in order to generate output audio data 335. In some examples, the device 110 may perform joint noise reduction (NR) and residual echo suppression (RES) processing 300 using the deep neural network (DNN) component 126. For example, FIG. 3 illustrates an example in which the device 110 includes an acoustic echo cancellation (AEC) component 122, the DNN component 126 configured to perform NR and RES processing, and/or a comfort noise generator (CNG) component 330. However, the disclosure is not limited thereto and the device 110 may include additional components without departing from the disclosure.

While not illustrated in FIG. 3, in some examples the device 110 may perform signal processing in a subband domain and/or frequency domain without departing from the disclosure. For example, a first analysis filterbank (not shown) may convert the microphone audio data 302 from the time domain (e.g., $z_0(n)$) to the subband domain (e.g., $Z_0(n, k)$), where n is the frame index, k=0 to N/2 is the frequency index, and N is the number of subbands. As described above, the microphone audio data 302 may include multiple channels corresponding to individual microphones 112 without departing from the disclosure. In some examples, the first analysis filterbank may be configured to convert each channel of the microphone audio data 302 from the time domain to the subband domain without departing from the disclosure. However, the disclosure is not limited thereto, and in other examples the device 110 may include a separate analysis filterbank for each individual microphone without departing from the disclosure. For example, the device 110 may include a second analysis filterbank configured to convert a second microphone signal of the microphone audio data 302 from the time domain (e.g., $z_1(n)$) to the subband domain (e.g., $Z_1(n, k)$), and so on.

Additionally or alternatively, the device 110 may include a third analysis filterbank configured to convert reference audio data 304 from the time domain (e.g., $x(n)$) to the subband domain (e.g., $X(n, k)$). In some examples, the third analysis filterbank may include a uniform discrete Fourier transform (DFT) filterbank to convert the reference audio data 304 from the time domain into the sub-band domain (e.g., converting to the frequency domain and then separating different frequency ranges into a plurality of individual sub-bands). Therefore, the audio signal X may incorporate reference audio signals corresponding to one or more loudspeakers 114, different sub-bands (i.e., frequency ranges), and different frame indices (i.e., time ranges). Thus, the audio signal associated with the xth loudspeaker 114 may be represented as $X_x(n, k)$, where n denotes the frame index and k denotes the sub-band index.

As illustrated in FIG. 3, the AEC component 122 may perform echo cancellation (e.g., AEC processing) to generate echo estimate data 312 as well as AEC output data 314, which may be referred to as isolated audio data. For example, the AEC component 122 may generate an echo estimate $Y'(n, k)$ using the reference signal $X(n, k)$ and may subtract the echo estimate $Y'(n, k)$ from the first microphone signal $Z_0(n, k)$ to generate first isolated signal $M_0(n, k)$. If the echo estimate $Y'(n, k)$ corresponds to the echo signal $Y(n, k)$ represented in the first microphone signal $Z_0(n, k)$, the AEC component 122 may effectively remove the echo signal and isolate the near-end speech $S(n, k)$. However, any differences between the echo estimate $Y'(n, k)$ and the echo signal $Y(n, k)$ may result in residual echo being represented in the first isolated signal $M_0(n, k)$. In order to remove this residual echo, the AEC component 122 may output the echo estimate data 312 in addition to the AEC output data 314 (e.g., first isolated signal $M_0(n, k)$) to the DNN component 126.

The DNN component 126 may be configured to process the echo estimate data 312 and the AEC output data 314 to jointly mitigate additive noise, reverberation, and/or residual echo and generate DNN output data 325. For example, the DNN component 126 may be configured to reduce noise and/or suppress echo signals (or other undesired audio) remaining in the first isolated signal $M_0(n, k)$ using an encoder/decoder architecture, as described in greater detail below with regard to FIG. 6. Thus, the DNN output data 325 may correspond to an enhanced speech signal which represents target speech more clearly than the AEC output data 314.

In some examples, the DNN component 126 may receive the echo estimate data 312 and the AEC output data 314 as audio signals. However, the disclosure is not limited thereto, and the DNN component 126 may receive complex spectrogram data corresponding to the echo estimate data 312 and the AEC output data 314 without departing from the disclosure. In some examples, the DNN component 126 may process first real spectrogram data and first imaginary spectrogram data corresponding to the AEC output data 314, as well as second real spectrogram data and second imaginary spectrogram data corresponding to the echo estimate data 312. In other examples, the DNN component 126 may process magnitude data corresponding to the echo estimate data 312 without departing from the disclosure. For example, the DNN component 126 may process the magnitude data corresponding to the echo estimate data 312 in addition to the first real spectrogram data and the first imaginary spectrogram data corresponding to the AEC output data 314, although the disclosure is not limited thereto.

In some examples, the DNN component 126 may process the echo estimate data 312 and the AEC output data 314 to generate speech mask data corresponding to the target speech. For example, the speech mask data may include a plurality of time-frequency values, with an individual time-frequency value indicating a gain value (or mask value) corresponding to an individual time index and frequency index. In some examples, the speech mask data may comprise continuous values ranging from a first value (e.g., 0) to a second value (e.g., 1), although the disclosure is not limited thereto. In this example, the first value corresponds to attenuation and indicates that the selected time-frequency unit does not represent the target speech. Thus, the frequency index is attenuated completely, such that the output audio data 335 does not contain any of the AEC output data 314 associated with the frequency index. In contrast, the second value corresponds to no attenuation (e.g., pass-through gain) and indicates that the selected time-frequency unit represents the target speech. Thus, the frequency index is passed without any attenuation, such that the output audio data 335 includes the AEC output data 314 associated with the frequency index.

In some examples, the DNN output data 325 may correspond to enhanced speech audio data. For example, the DNN component 126 may use the speech mask data and the AEC output data 314 to generate an enhanced speech signal and may output the enhanced speech signal to the CNG component 330. However, the disclosure is not limited thereto, and in other examples the DNN component 126 may generate complex spectrogram data representing the target speech without departing from the disclosure. For example, the DNN output data 325 may correspond to complex spectrogram data, which may include real spectrogram data and imaginary spectrogram data, although the disclosure is not limited thereto. Additionally or alternatively, the DNN output data 325 may correspond to the speech mask data without departing from the disclosure. For example, the DNN component 126 may output the speech mask data and the CNG component 330 and/or an additional component (not illustrated) may process the speech mask data to generate the enhanced speech audio data without departing from the disclosure.

While the example described above refers to the DNN component 126 generating the speech mask data as an intermediate processing step, the disclosure is not limited thereto and the DNN component 126 may generate the enhanced speech audio data without departing from the disclosure. For example, instead of performing two separate steps to generate the speech mask data and then combine the speech mask data with the AEC output data 314 to generate the enhanced speech audio data, the DNN component 126 may be configured to directly generate the enhanced speech audio data. Thus, the DNN component 126 may process the echo estimate data 312 and the AEC output data 314 to perform dereverberation, noise reduction, and/or residual echo suppression and generate the enhanced speech audio data without departing from the disclosure.

In some examples, the DNN component 126 may also process additional data 320 without departing from the disclosure. Examples of additional data 320 may include the microphone audio data 302, the reference audio data 304, multichannel reference audio data, speaker type detection data (e.g., classification type and/or number of external loudspeakers configured to generate output audio), state data (e.g., current state of the device), motion data (e.g., linear velocity if the device 110 is in motion, angular velocity if the device 110 is rotating, etc.), and/or the like, although the disclosure is not limited thereto. By feeding the additional data 320 to the DNN component 126, the device 110 may improve an accuracy of the DNN output data 325.

Figure 4A:
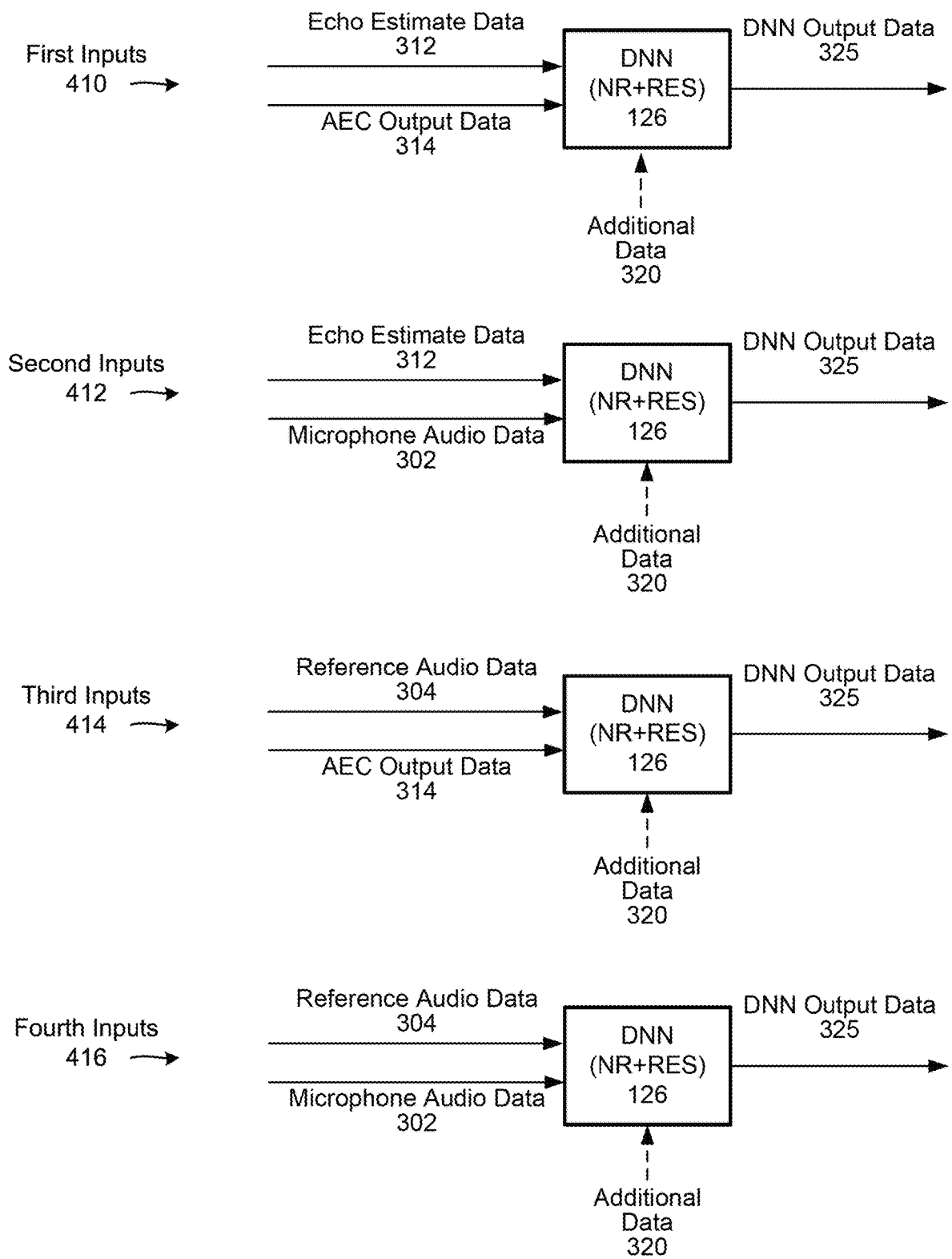

FIG. 4A illustrates examples of input signals according to embodiments of the present disclosure. While the joint NR+RES processing 300 illustrated in FIG. 3 corresponds to an example of the DNN component 126 processing first inputs 410 (e.g., echo estimate data 312 and AEC output data 314), the disclosure is not limited thereto. In some examples, the DNN component 126 may process the microphone audio data 302 instead of processing the AEC output data 314 without departing from the disclosure. Additionally or alternatively, the DNN component 126 may process the reference audio data 304 instead of processing the echo estimate data 312 without departing from the disclosure. For example, if the reference audio data 304 is a multi-channel reference, the DNN component 126 may process the reference audio data 304 instead of multi-channel echo estimates. Thus, the DNN component 126 may process any combination of the microphone audio data 302, the reference audio data 304, the echo estimate data 312, and/or the AEC output data 314 without departing from the disclosure.

As illustrated in FIG. 4A, in a first example the DNN component 126 may process first inputs 410 (e.g., echo estimate data 312 and AEC output data 314), whereas in a second example the DNN component 126 may process second inputs 412 (e.g., echo estimate data 312 and microphone audio data 302). Additionally or alternatively, in a third example the DNN component 126 may process third inputs 414 (e.g., reference audio data 304 and AEC output data 314), whereas in a fourth example the DNN component 126 may process fourth inputs 416 (e.g., reference audio data 304 and microphone audio data 302).

In some examples, the DNN component 126 may process complex spectrogram data associated with an input signal. However, the disclosure is not limited thereto and in other examples the DNN component 126 may process magnitude (e.g., absolute value) data and/or phase data associated with the input signal without departing from the disclosure.

FIG. 4B illustrates example auxiliary information 430 according to embodiments of the present disclosure. As illustrated in FIG. 4B, examples of additional data 320 may include the microphone audio data 302 and/or the reference audio data 304 that are input to the AEC component 122. As the AEC component 122 generates the echo estimate data 312 using the reference audio data 304 and then subtracts the echo estimate data 312 from the microphone audio data 302 to generate the AEC output data 314, processing the microphone audio data 302 and/or the reference audio data 304 may enable the DNN component 126 to more accurately identify residual echo represented in the AEC output data 314. Thus, including the microphone audio data 302 and/or the reference audio data 304 may provide the DNN component 126 additional information that may be used to identify additive noise and/or the residual echo.

In some examples, the additional data 320 may include motion data 440 and/or state data 450 associated with the device 110. The motion data 440 may include a variety of information, such as a linear velocity 442 if the device 110 is in motion (e.g., such as for a device 110 capable of autonomous movement), an angular velocity 444 if the device 110 is capable of rotation (e.g., rotating a display of the device 110), and/or the like. Similarly, the state data 320 may indicate a current state of the device 110 and/or additional state information indicating current conditions and/or settings associated with the device 110.

In some examples, the additional data 320 may include multichannel reference audio data 460 and/or speaker type detection data 470. For example, the device 110 may be configured to output media content, which may include sending the multichannel reference audio data 460 to one or more external loudspeakers. In this example, the device 110 may perform speaker type detection to determine a classification type of loudspeaker(s), a total number of external loudspeakers, and/or the like. In some examples, the speaker type detection may correspond to classification data indicating a classification type associated with one or more external loudspeaker(s) (e.g., external to the device 110), with the classification type indicating whether the loudspeaker(s) correspond to a soundbar device, a surround sound system (e.g., 5.1 surround sound, 7.1 surround sound, and/or the like), other audio output devices, and/or the like, although the disclosure is not limited thereto.

As illustrated in FIG. 4B, the type and amount of additional data 320 may vary depending on the device 110. For example, a first device 110a may be configured to generate the output media content described above. Thus, the first device 110a may process first additional data 320a, which may include the multichannel reference audio data 460, the speaker type detection data 470, and/or other auxiliary information corresponding to outputting media content using external loudspeakers. In contrast, a second device 110b may be capable of autonomous movement and may process second additional data 320b, which may include motion data 440 (e.g., linear velocity 442), state data 450, and/or the like without departing from the disclosure.

Referring back to FIG. 3, while FIG. 3 illustrates an example in which the DNN component 126 sends the DNN output data 325 to the CNG component 330, the disclosure is not limited thereto. In some examples, the device 110 may include a residual echo suppression (RES) component (not illustrated), which may be configured to receive the DNN output data 325 and perform additional residual echo suppression processing. For example, the RES component may perform basic RES processing to generate processed data and may send the processed data to the CNG component 330, although the disclosure is not limited thereto.

As illustrated in FIG. 3, the CNG component 330 may be configured to receive the DNN output data 325 and generate output audio data 335. For example, the CNG component 330 may generate a first noise signal $N_{GEN}$ using a comfort noise gain ($G_{CNG}$) and may apply the first noise signal $N_{GEN}$ to the DNN output data 325 to generate the output audio data 335. The CNG processing may be beneficial as it adds a small amount of noise that helps smooth transitions caused by the AEC component 122 and/or the DNN component 126 attenuating the signal.

While not illustrated in FIG. 3, in some examples the device 110 may include additional components before and/or after the CNG component 330. For example, the device 110 may include an automatic gain control (AGC) component (not illustrated) (which may also be referred to as adaptive gain control) and/or a dynamic range compression (DRC) component (not illustrated) (which may also be referred to as dynamic range control) to generate the output signal without departing from the disclosure. The device 110 may apply the AGC processing and/or the DRC processing using any techniques known to one of skill in the art.

In some examples, the CNG component 330 may receive the DNN output data 325 as complex spectrogram data and may generate the output audio data 335 as audio signals. For example, the CNG component 330 may perform additional processing steps, such as overlap and add filtering and/or the like, to convert the complex spectrogram data to audio waveforms without departing from the disclosure.

While not illustrated in FIG. 3, in some examples the device 110 may include a synthesis filterbank configured to convert the output audio data 335 from the subband domain (e.g., signal OUT(n, k)) to the time domain (e.g., out(t)). For example, if the output signal is in the subband domain and includes a plurality of separate sub-bands (e.g., individual frequency bands), the synthesis filterbank may combine the plurality of subbands to generate the output signal out(t) in the time domain without departing from the disclosure.

Figure 5:
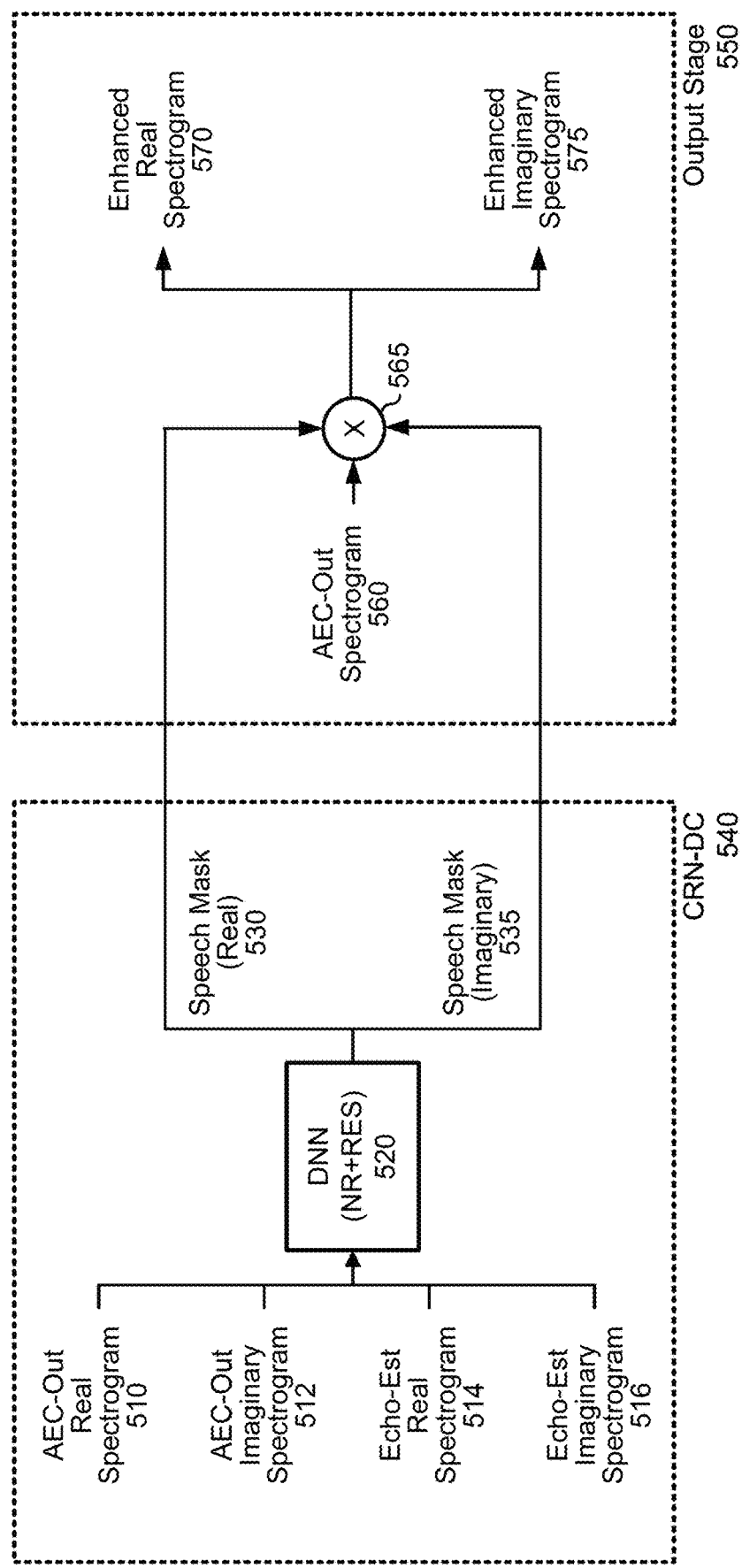
FIG. 5 illustrates an example of a densely connected convolutional recurrent network according to examples of the present disclosure.

FIG. 5 illustrates an example of a densely connected convolutional recurrent network according to examples of the present disclosure. As illustrated in FIG. 5, in some examples the device 110 may perform joint NR and RES processing 500 using a densely connected convolutional recurrent network (CRN-DC) 540 configured to generate speech mask data without departing from the disclosure. For example, the CRN-DC 540 may be configured to generate the speech mask data and an output stage 550 may be configured to generate enhanced speech data using the speech mask data. However, while FIG. 5 illustrates an example in which the CRN-DC 540 generates the speech mask data, the disclosure is not limited thereto and the CRN-DC 540 may generate the enhanced speech data without departing from the disclosure.

As illustrated in FIG. 5, in some examples the device 110 may perform the joint NR and RES processing 500 using complex spectrogram data without departing from the disclosure. For example, the CRN-DC 540 may process the AEC output data 314 as first complex spectrogram data (e.g., AEC-Out real spectrogram 510 and AEC-Out imaginary spectrogram 512) and the echo estimate data 312 as second complex spectrogram data (e.g., Echo-Est real spectrogram 514 and Echo-Est imaginary spectrogram 516). However, the disclosure is not limited thereto, and the CRN-DC 540 may process the echo estimate data 312 and/or the AEC output data 314 as audio data, complex spectrogram data, phase/magnitude data, and/or the like without departing from the disclosure. For example, the CRN-DC 540 may process the echo estimate data 312 as a magnitude spectrum without departing from the disclosure.

Similarly, the CRN-DC 540 may generate the speech mask data as complex data (e.g., speech mask (real) 530 and speech mask (imaginary) 535) and the output stage 550 may generate the enhanced speech data as third complex spectrogram data (e.g., enhanced real spectrogram 570 and the enhanced imaginary spectrogram 575), although the disclosure is not limited thereto.

As illustrated in FIG. 5, the CRN-DC 540 may include a DNN component 520 configured to jointly perform noise reduction and residual echo suppression (NR+RES). In some examples, the DNN component 520 may process the AEC-Out real spectrogram 510, the AEC-Out imaginary spectrogram 512, the Echo-Est real spectrogram 514, and the Echo-Est imaginary spectrogram 516 in order to generate the speech mask (real) 530 and the speech mask (imaginary) 535, as described below with regard to FIG. 6. Additionally or alternatively, while not illustrated in FIG. 5, the DNN component 520 may also process the additional data 320 without departing from the disclosure, as described in greater detail above with regard to FIG. 4B.

When the DNN component 520 is configured to generate speech mask data, the device 110 may perform additional processing to generate the DNN output data 325 illustrated in FIG. 3. For example, the device 110 may include the CRN-DC 540 along with additional components and/or logic configured to process the speech mask data to generate the DNN output data 325, such as the output stage 550.

In the example illustrated in FIG. 5, the output stage 550 may be configured to generate enhanced spectrogram data. For example, the output stage 550 may include a combining (e.g., multiplier) component 565 configured to multiply the speech mask data (e.g., the speech mask (real) 530 and the speech mask (imaginary) 535) with the AEC-Out spectrogram 560 (e.g., the AEC-Out real spectrogram 510 and the AEC-Out imaginary spectrogram 512) to generate the enhanced spectrogram data (e.g., the enhanced real spectrogram 570 and the enhanced imaginary spectrogram 575). Thus, the output stage 550 multiplies the speech mask data by the AEC-Out spectrogram 560 to generate the enhanced spectrogram data, which ideally only has de-reverberant speech without any traces of additive noise and residual echo. In some examples, the device 110 only calculates the enhanced spectrogram data in a loss function and/or during inferencing, although the disclosure is not limited thereto.

While FIG. 5 illustrates the DNN component 520 generating the speech mask data, the disclosure is not limited thereto and the output of the DNN component 520 may vary without departing from the disclosure. In other examples, the DNN component 520 may generate complex spectrogram data representing the speech without departing from the disclosure. For example, instead of performing two steps to generate the speech mask data and combine the speech mask data with the AEC output data 314 to generate the complex spectrogram data representing target speech, the DNN component 520 may be configured to directly output complex spectrogram data representing the target speech. Thus, the DNN component 520 may process the estimated echo data 312 and the AEC output data 314 to perform dereverberation, noise reduction, and/or residual echo suppression and generate the complex spectrogram data without departing from the disclosure.

In some examples, the DNN component 126 may generate complex spectrogram data representing the speech, such as the enhanced real spectrogram 570 and enhanced imaginary spectrogram 575 illustrated in FIG. 5. Thus, additional components (e.g., CNG component 330, AGC component, and/or the like) of the device 110 may further process the complex spectrogram data before generating output audio data in the time domain (e.g., by performing overlap and add filtering and/or the like). However, the disclosure is not limited thereto, and in other examples the DNN component 126 may output processed audio data without departing from the disclosure. For example, the device 110 may process the input signals using the trained model to generate speech mask data, and the device 110 may then use the speech mask data to generate the processed audio data in the time domain without departing from the disclosure.

Figure 6:
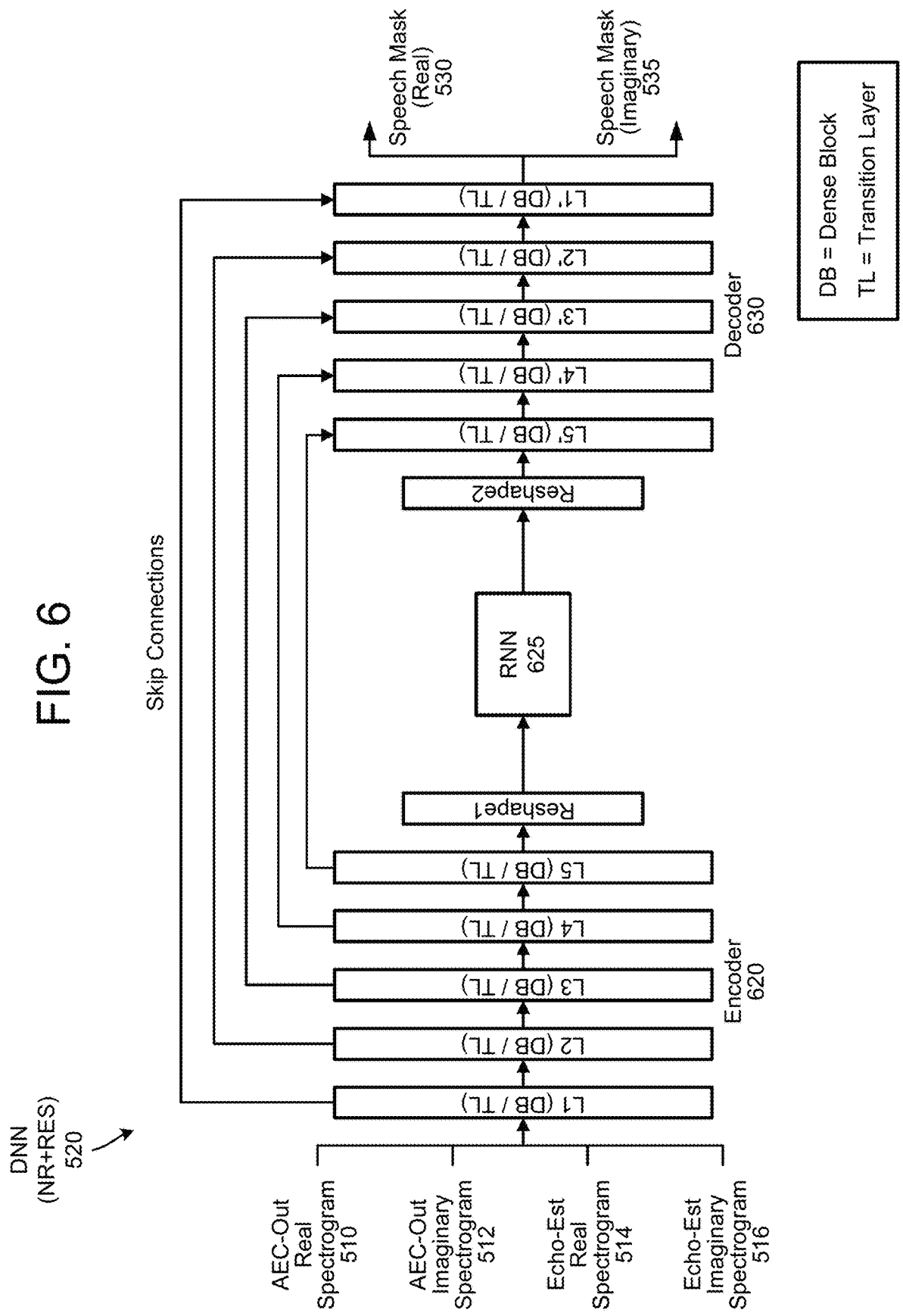
FIG. 6 illustrates an example component diagram for performing noise reduction and residual echo suppression within a voice processing pipeline according to examples of the present disclosure.

FIG. 6 illustrates an example component diagram for performing noise reduction and residual echo suppression within a voice processing pipeline according to examples of the present disclosure. As illustrated in FIG. 6, a DNN component 520 may use an encoder-decoder structure, with skip connections connecting layers in an encoder 620 with corresponding layers in a decoder 630. In addition, the DNN component 520 may include a recurrent neural network (RNN) component 625 between the encoder 620 and the decoder 630, as described in greater detail below with regard to FIG. 8.

The input to the encoder 620 is a first complex-valued spectrogram of the AEC output data 314 and a second complex-valued spectrogram of the echo estimate data 312. Thus, the DNN component 520 may be configured to process four input channels, such that the encoder 620 receives an AEC-Out real spectrogram 510, an AEC-Out imaginary spectrogram 512, an Echo-Est real spectrogram 514, and an Echo-Est imaginary spectrogram 516.

In some examples, the DNN component 520 may receive real and imaginary spectrograms corresponding to the microphone audio data 302 and/or the reference audio data 304, although the disclosure is not limited thereto. Additionally or alternatively, the DNN component 520 may receive additional data 320, as described in greater detail above with regard to FIG. 4B.

After processing the input data using the encoder component 620, the RNN component 625, and the decoder component 630, the DNN component 520 may generate a complex-valued mask that retains most of the target speech while suppressing and/or attenuating the additive noise components and residual echo. For example, the decoder component 630 may generate a speech mask (real) 530 representing real components of the speech and a speech mask (imaginary) 535 representing imaginary components of the speech.

As illustrated in FIG. 6, the encoder 620 may include five stacked dense convolutional layers, followed by a reshape layer, although the disclosure is not limited thereto. An individual convolutional layer may include a dense block followed by a transition layer, as described in greater detail below with regard to FIG. 7. For example, at the end of each dense layer, a transition layer controls the number of feature maps propagating from one dense block to another and also applies downsampling and upsampling of the feature maps in the encoder 620 and decoder 630, respectively. In some examples, one or more of the convolutional layers may be implemented as a depthwise separable convolution without departing from the disclosure. For example, performing depthwise separable convolution may apply a kernel that processes each channel individually (e.g., without mixing channels) and then combining the channels together (e.g., stacking convolved feature maps into an output tensor), although the disclosure is not limited thereto. While not illustrated in FIG. 6, the DNN component 520 may include a dropout layer in order to apply regularization to the DNN modeling, although the disclosure is not limited thereto.

Figure 7:
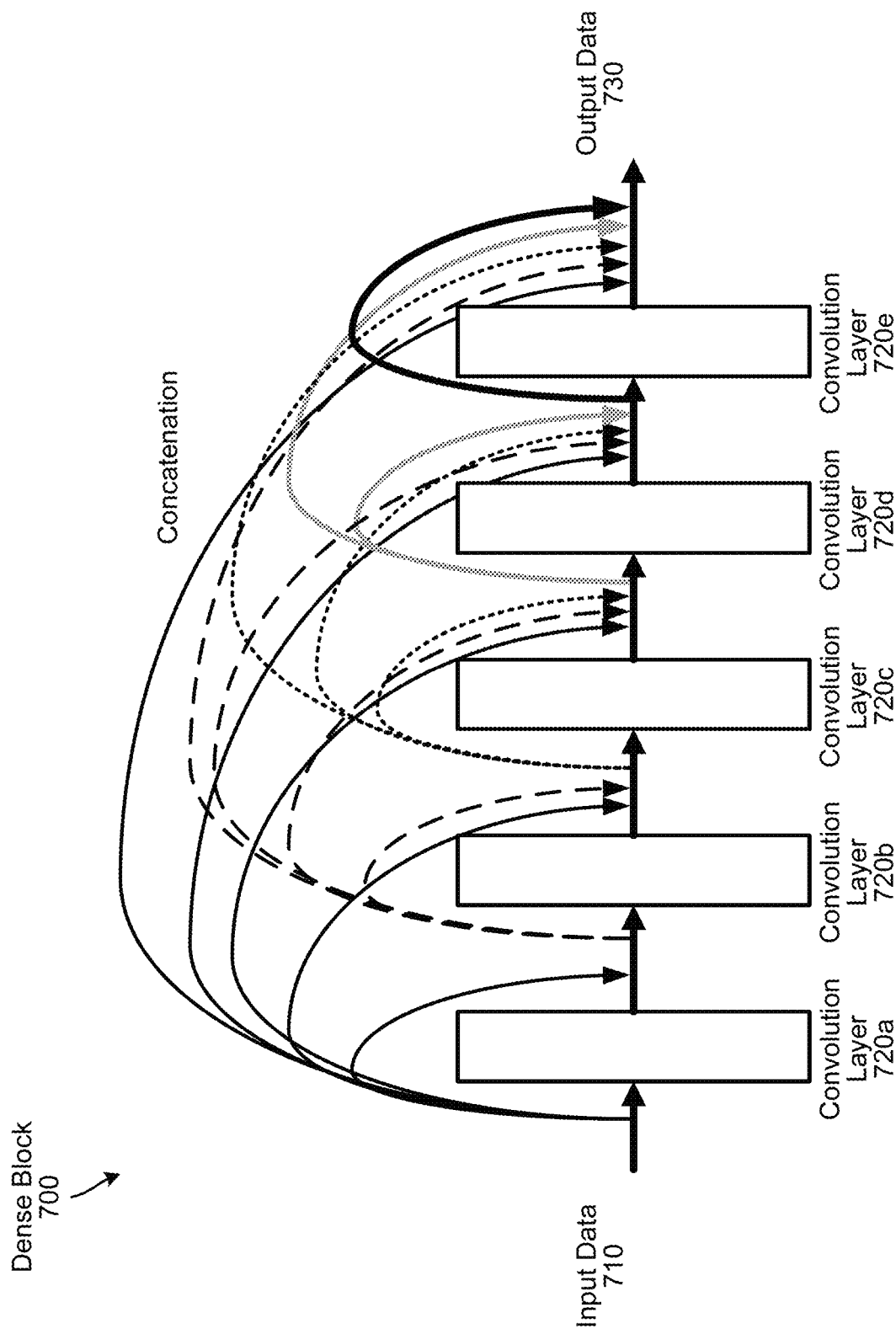
FIG. 7 illustrates an example structure of a dense block according to embodiments of the present disclosure.

FIG. 7 illustrates an example structure of a dense block according to embodiments of the present disclosure. As illustrated in FIG. 7, a dense block 700 is composed of stack convolutional layers 720 such that a layer deeper in the stack receives the feature maps of all preceding convolutional layers 720. For example, a first convolution layer 720a receives input data 710 and generates a first output, which is concatenated with the input data 710 to generate a first combined input to a second convolution layer 720b. The second convolution layer 720b processes the first combined input (e.g., concatenation of the input data 710 and the first output) to generate a second output, which is concatenated with the input data 710 and the first output to generate a second combined input to a third convolution layer 720c. The third convolution layer 720c processes the second combined input (e.g., concatenation of the input data 710, the first output, and the second output), and so on until a fifth convolution layer 720e generates output data 730. Thus, the fifth convolution layer 720e generates the output data 730, which includes all of the feature layers of the dense block 700 stacked together.

As continuing this process would result in a huge number of feature layers and increase processing consumption of the device 110, the DNN component 520 may include a transition layer configured to control the number of feature maps propagating from one dense block 700 to another and also applying downsampling and upsampling of the feature maps in the encoder 620 and decoder 630, respectively. Thus, the DNN component 520 includes transition layers between each dense block in order to limit how many feature layers are passed between the dense blocks. For example, a first dense convolution layer (L1) of the encoder 620 may include a first dense block 700a and a first transition layer. The first dense block 700a may be configured to generate first output data 730a comprising a first number of feature layers, while the first transition layer may act as a bottleneck layer and generate output data comprising a second number of feature layers. In some examples, the first transition layer may reduce from the first number of feature layers (e.g., 200) to the second number of feature layers (e.g., 40), although the disclosure is not limited thereto and the number of feature layers may vary without departing from the disclosure.

Referring back to FIG. 6, the decoder component 630 may mirror the encoder component 620 by including a reshape layer and five stacked dense convolutional layers, which perform similar processing as described above with regard to the encoder component 620. The output of the decoder component 630 is a speech mask (real) 530 representing real components of the speech and a speech mask (imaginary) 535 representing imaginary components of the speech.

While FIG. 6 illustrates an example in which the encoder component 620 and the decoder component 630 include five stacked dense convolutional layers, the disclosure is not limited thereto. In some examples, the encoder component 620 and the decoder component 630 may have any number of stacked dense convolutional layers without departing from the disclosure. For example, the encoder component 620 and the decoder component 630 may include three stacked dense convolutional layers, although the disclosure is not limited thereto. Thus, the encoder component 620 and/or the decoder component 630 may contain anywhere from two stacked dense convolutional layers to N stacked dense convolutional layers without departing from the disclosure.

Between the encoder component 620 and the decoder component 630, the DNN component 520 may include the RNN component 625 in order to model the long-term temporal variations. While the dense blocks are a form of deeper tensor, the RNN component 625 may work on a time sequence in a single dimension. To enable the RNN component 625 to function properly, the DNN component 520 may include reshape layers (e.g., Reshape1 and Reshape2) and/or an optional dropout layer (e.g., Dropout x %, not illustrated) configured to perform regularization. For example, these layers may be regularization layers configured to flatten the tensor output of the dense blocks to an input that the RNN component 625 is configured to consume.

Figure 8:
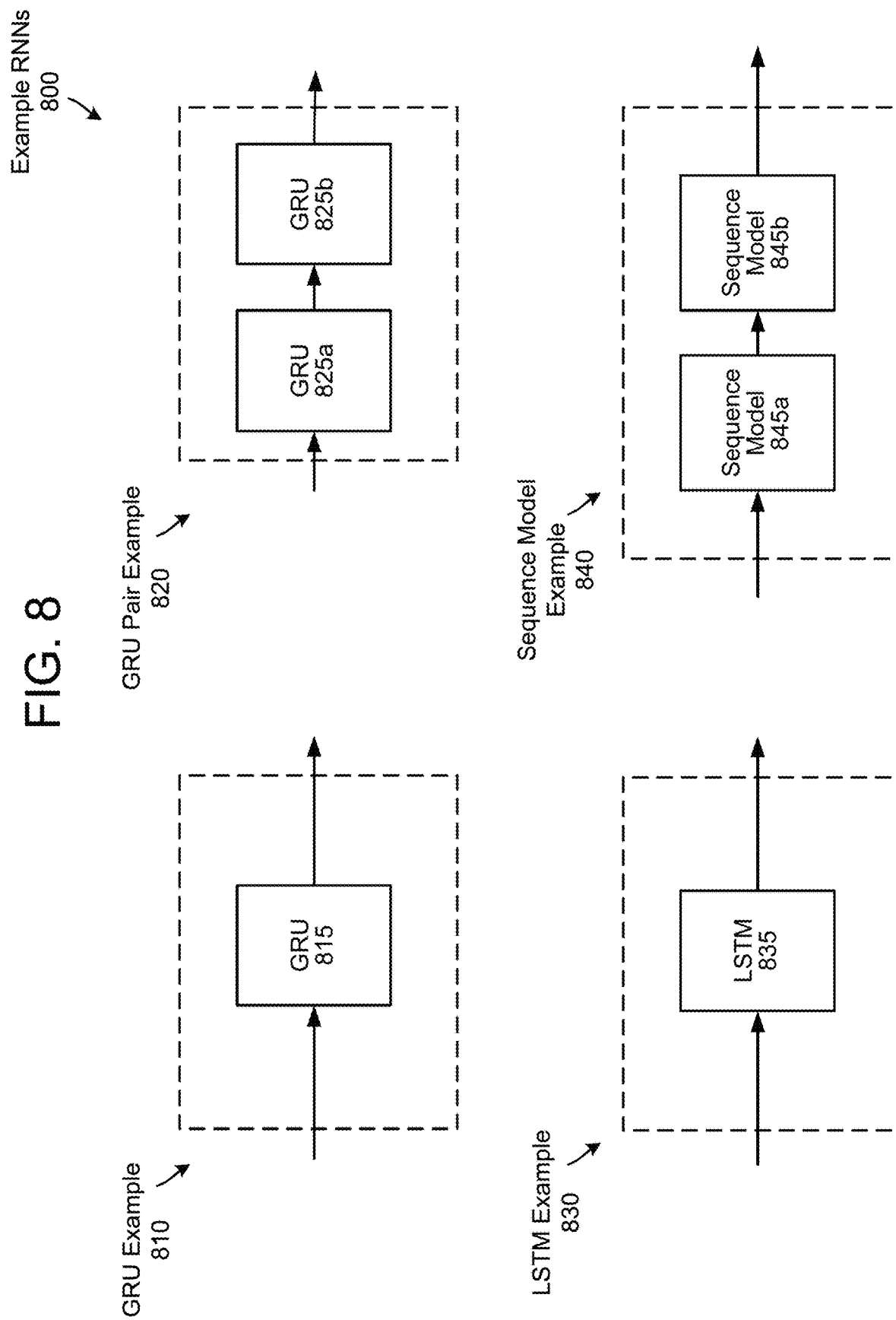
FIG. 8 illustrates examples of recurrent neural network components according to embodiments of the present disclosure.

FIG. 8 illustrates examples of recurrent neural network components according to embodiments of the present disclosure. As illustrated in FIG. 8, the RNN component 625 may correspond to a variety of different layers, such as a gated recurrent unit (GRU), multiple GRUS, long short-term memory (LSTM) layers, one or more sequence models, and/or the like without departing from the disclosure. For example, example RNNs 800 may include a GRU example 810 (e.g., a single GRU layer 815), a GRU pair example 820 (e.g., two GRU layers 825a/825b), an LSTM example 830 (e.g., a single LSTM layer 835), and a sequence model example 840 (e.g., two sequence model layers 845a/845b). However, these examples are intended to conceptually illustrate an example and the disclosure is not limited thereto. Thus, the DNN component 520 may include any type, number, and/or combination of recurrent layers without departing from the disclosure.

Referring back to FIG. 6, the DNN component 520 may include skip connections that connect layers between the encoder 620 and the decoder 630. For example, a fifth dense convolution layer (L5) of the encoder 620 may have a first skip connection to a first dense convolution layer (L5') of the decoder 630, a fourth dense convolution layer (L4) of the encoder 620 may have a second skip connection to a second dense convolution layer (L4') of the decoder 630, and so on. These skip connections are used during training with back propagation, allowing better gradient flow to train the DNN component 520. Thus, the skip connections enable the DNN component 520 to update weights properly during back propagation, as without the skip connections the gradient layers vanish and the weights may not be updated properly.

While FIG. 6 illustrates an example in which each dense convolution layer of the encoder 620 receives the combined inputs (e.g., AEC-Out real spectrogram 510, AEC-Out imaginary spectrogram 512, Echo-Est real spectrogram 514, and Echo-Est imaginary spectrogram 516), the disclosure is not limited thereto. In some examples, the DNN component 520 may include separate sets of dense convolution layers, with a first set processing the AEC-Out input (e.g., AEC-Out real spectrogram 510 and AEC-Out imaginary spectrogram 512), and a second set processing the Echo-Est input (e.g., Echo-Est real spectrogram 514 and Echo-Est imaginary spectrogram 516). For example, the first dense convolution layer (L1) could be split in half, with a first portion processing the AEC-Out input and a second portion processing the Echo-Est input. The encoder 620 could continue to separate these inputs for one to three dense convolution layers (e.g., L1, L1-L2, or L1-L3) without departing from the disclosure. For example, the encoder 620 of the DNN component 520 could separate the two input signals for the first three dense convolution layers (e.g., L1-L3), then a third transition layer of the third dense convolution layer (L3) may combine the two sets of feature layers and output the combined feature layers to the fourth dense convolution layer (L4), although the disclosure is not limited thereto. However, the number of dense convolution layers and/or how the feature layers are combined may vary without departing from the disclosure. For example, the DNN component 520 may combine the two sets of feature layers using a transition layer associated with the dense convolution layers, as described above, or the DNN component 520 may include an additional bottleneck layer with an additional skip connection without departing from the disclosure.

While FIG. 6 illustrates examples in which the encoder component 620 and the decoder component 630 each includes five stacked dense convolutional layers, the disclosure is not limited thereto. Instead, the number of convolutional layers may vary without departing from the disclosure. For example, this may be a design parameter and the DNN component 520 may include fewer convolutional layers or additional convolutional layers without departing from the disclosure.

As illustrated in FIG. 6, in some examples the DNN component 520 may process complex spectrogram data without departing from the disclosure. For example, the device 110 may process the AEC output data 314 to generate the AEC-Out real spectrogram 510 and the AEC-Out imaginary spectrogram 512. Similarly, the device 110 may process the echo estimate data 312 to generate the Echo-Est real spectrogram 514 and the Echo-Est imaginary spectrogram 516. Thus, the DNN component 520 may process the AEC-Out real spectrogram 510, the AEC-Out imaginary spectrogram 512, the Echo-Est real spectrogram 514, and the Echo-Est imaginary spectrogram 516, without departing from the disclosure.

The disclosure is not limited thereto, however, and the DNN component 520 may process other complex spectrogram data without departing from the disclosure. For example, the DNN component 520 may process a phase/magnitude representation of the AEC output data 314 and/or the echo estimate data 312, a single-input magnitude representation of the AEC output data 314 and/or the echo estimate data 312, and/or the like without departing from the disclosure. Additionally or alternatively, the DNN component 520 may process a time-domain signal without departing from the disclosure. For example, the DNN component 520 may process the AEC output data 314 and/or the echo estimate data 312 in the time-domain without departing from the disclosure.

As illustrated in FIG. 6, the DNN component 520 may generate speech mask data, such as the speech mask (real) 530 representing real components of the speech and the speech mask (imaginary) 535 representing imaginary components of the speech, without departing from the disclosure. This enables the device 110 to output the speech mask data to additional components for further processing and/or functionality. For example, the DNN component 126 may output the speech mask data to the CNG component 330, a voice activity detection (VAD) component (not illustrated), an automatic gain control (AGC) component (not illustrated), and/or other components without departing from the disclosure. In some examples, the speech mask data may be used as an estimate of voice activity detection without performing VAD processing, although the disclosure is not limited thereto.

Figure 9:
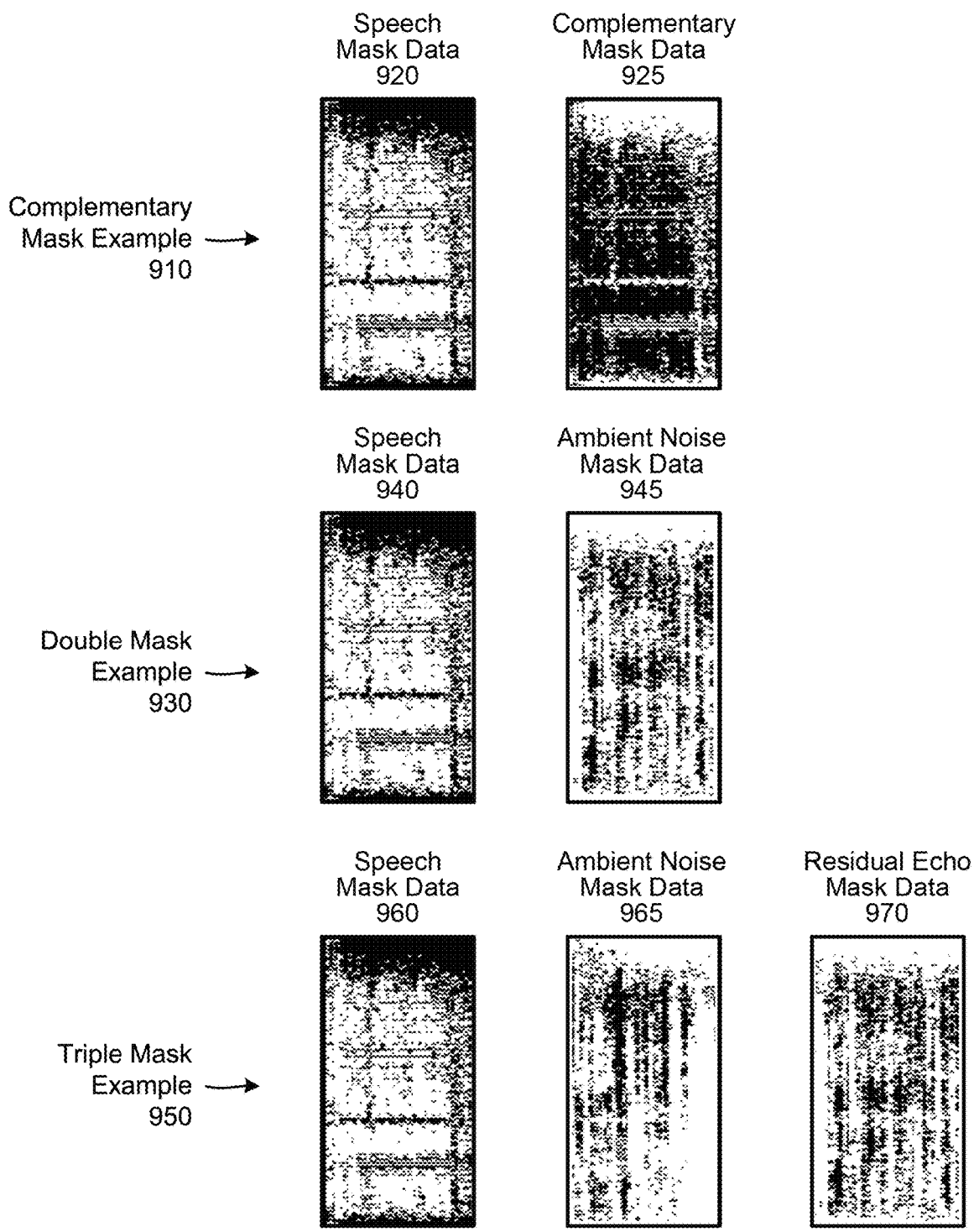
FIG. 9 illustrates examples of mask data generated by the densely connected convolutional recurrent network according to embodiments of the present disclosure.

FIG. 9 illustrates examples of mask data generated by the densely connected convolutional recurrent network according to embodiments of the present disclosure. As described in greater detail above, the device 110 may generate speech mask data corresponding to target speech, with the speech mask data enabling the device 110 to generate enhanced audio data representing the target speech. For example, the speech mask data may include a plurality of time-frequency values, with an individual time-frequency value indicating a gain value (or mask value) corresponding to an individual time index and frequency index.

In some examples, the speech mask data may comprise continuous values ranging from a first value (e.g., 0) to a second value (e.g., 1), although the disclosure is not limited thereto. In these examples, the first value corresponds to attenuation and indicates that the selected time-frequency unit does not represent the target speech. Thus, the frequency index is attenuated completely, such that the output audio data 335 does not contain any of the AEC output data 314 associated with the frequency index. In contrast, the second value corresponds to no attenuation (e.g., pass-through gain) and indicates that the selected time-frequency unit represents the target speech. Thus, the frequency index is passed without any attenuation, such that the output audio data 335 includes the AEC output data 314 associated with the frequency index.

In the examples illustrated in FIG. 9, the first value (e.g., 0) is represented by a first color (e.g., black) and indicates that the frequency index is not associated with the target speech for a particular time index, while the second value (e.g., 0) is represented by a second color (e.g., white) and indicates that the corresponding frequency index is associated with the target speech for a particular time index. Using the speech mask data, the device 110 may select portion(s) of the AEC output data 314 that represents the target speech as part of reconstructing an audio waveform and generating output audio data corresponding to the target speech.

For ease of illustration, the mask data illustrated in FIG. 9 is represented as a binary mask, such that a value of the time-frequency units corresponds to a first binary value (e.g., 0) or a second binary value (e.g., 1). However, this is intended to conceptually illustrate a simple example and the disclosure is not limited thereto. Instead, the mask data may be represented using continuous values ranging from the first value (e.g., 0) to the second value (e.g., 1), such that the value indicates a variable amount of attenuation. For example, a time-frequency unit may be associated with both target speech and noise without departing from the disclosure, with a third value (e.g., 0.50) indicating that the time-frequency unit corresponds to partial attenuation (e.g., 50% attenuation), although the disclosure is not limited thereto.

In some examples, the DNN component 126 may be configured to generate a single output signal without departing from the disclosure. For example, FIG. 9 illustrates a complementary mask example 910, in which the DNN component 126 may generate speech mask data 920 corresponding to the target speech. Using the speech mask data 920, the device 110 may generate first audio data representing the target speech.

While the DNN component 126 is only configured to generate the speech mask data 920, the device 110 may generate complementary mask data 925 by taking an inverse of the target mask data 920. As the complementary mask data 925 is an inverse of the speech mask data 920, the complementary mask data 925 may represent everything but the target speech, such as additive noise, residual echo, and/or the like. In some examples, the device 110 may optionally use the complementary mask data 925 to generate second audio data representing everything but the target speech, although the disclosure is not limited thereto.

In other examples, the DNN component 126 may be configured to generate two masks without departing from the disclosure. For example, FIG. 9 illustrates a double mask example 930, in which the DNN component 126 may generate speech mask data 940 corresponding to the target speech and ambient noise mask data 945 corresponding to background noise (e.g., acoustic ambient noise, environmental noise, and/or the like). Using the target mask data 940 and the ambient noise mask data 945, the device 110 may generate first audio data representing the target speech and second audio data representing the noise signal(s), although the disclosure is not limited thereto. For example, the device 110 may combine the first audio data and a portion of the second audio data in order to represent the target speech and a portion of background noise, as described in greater detail below with regard to FIG. 10.

Additionally or alternatively, the DNN component 126 may be configured to generate three masks without departing from the disclosure. For example, FIG. 9 illustrates a triple mask example 950, in which the DNN component 126 may be configured to generate speech mask data 960 representing target speech, ambient noise mask data 965 representing background noise (e.g., acoustic ambient noise, environmental noise, and/or the like), and residual echo mask data 970 representing residual echo and/or other undesired audio. Using the speech mask data 960, the device 110 may generate first audio data representing the target speech. Using the ambient noise mask data 965, the device 110 may generate second audio data representing background noise, which may optionally be added to the first audio data to provide a listener with ambient sounds captured by the device 110. In contrast, the device 110 may use the residual echo mask data 970 to suppress the residual echo and/or other undesired audio without departing from the disclosure. For example, the device 110 may generate third audio data representing the residual echo and may perform additional processing to remove at least a portion of the third audio data, although the disclosure is not limited thereto.

As used herein, the ambient noise mask data 945/965 may correspond to acoustic ambient noise present in an environment of the device 110. For example, the acoustic ambient noise may correspond to human-generated audible sounds (e.g., speech, singing, music, and/or the like generated by humans), audible sounds associated with one or more acoustic events (e.g., pet noises, mechanical noises unrelated to the device 110, road noise, and/or the like), music or other media content output by loudspeakers in the environment (e.g., output audio not associated with the device 110), background noise(s) (e.g., hum of conversation, sounds of nature, etc.), and/or the like. However, the acoustic ambient noise does not correspond to mechanical noise and/or structural noise associated with the device 110, which should instead be included in the residual echo mask data 970. For example, movement of the device 110 may result in structural borne noise (e.g., conductive noise and/or vibrations) that transfers sound waves via physical connections to the microphone(s) 112, resulting in the audio data capturing audible sounds that are not perceived by the user. Thus, the device 110 may generate the ambient noise mask data 945/965 corresponding to the acoustic ambient noise perceived by the user, which the user may wish to capture or share, without including the mechanical noise and/or structural noise caused by the device 110. Additionally or alternatively, in some examples the device 110 may generate the residual echo mask data 970 to include the mechanical noise and/or structural noise, enabling the device 110 to further suppress or attenuate the mechanical noise and/or structural noise.

While the example illustrated in FIG. 1 illustrates the DNN component 126 sending the DNN output data 127 to the transmit-side post processing component(s) 128 for additional processing, the disclosure is not limited thereto. In some examples, the DNN component 126 may optionally send mask data, complex spectrogram data, and/or audio data to additional components without departing from the disclosure. For example, the DNN component 126 may send the speech mask data 920/940/960 to a voice activity detector (VAD) component (not illustrated) and the VAD component may use the speech mask data to perform VAD processing. Additionally or alternatively, the DNN component 126 may send the ambient noise mask data 945/965 to the CNG component 330 without departing from the disclosure. For example, the CNG component 330 may use the ambient noise mask data 945/965 to perform comfort noise generation (CNG) processing.

Figure 10:
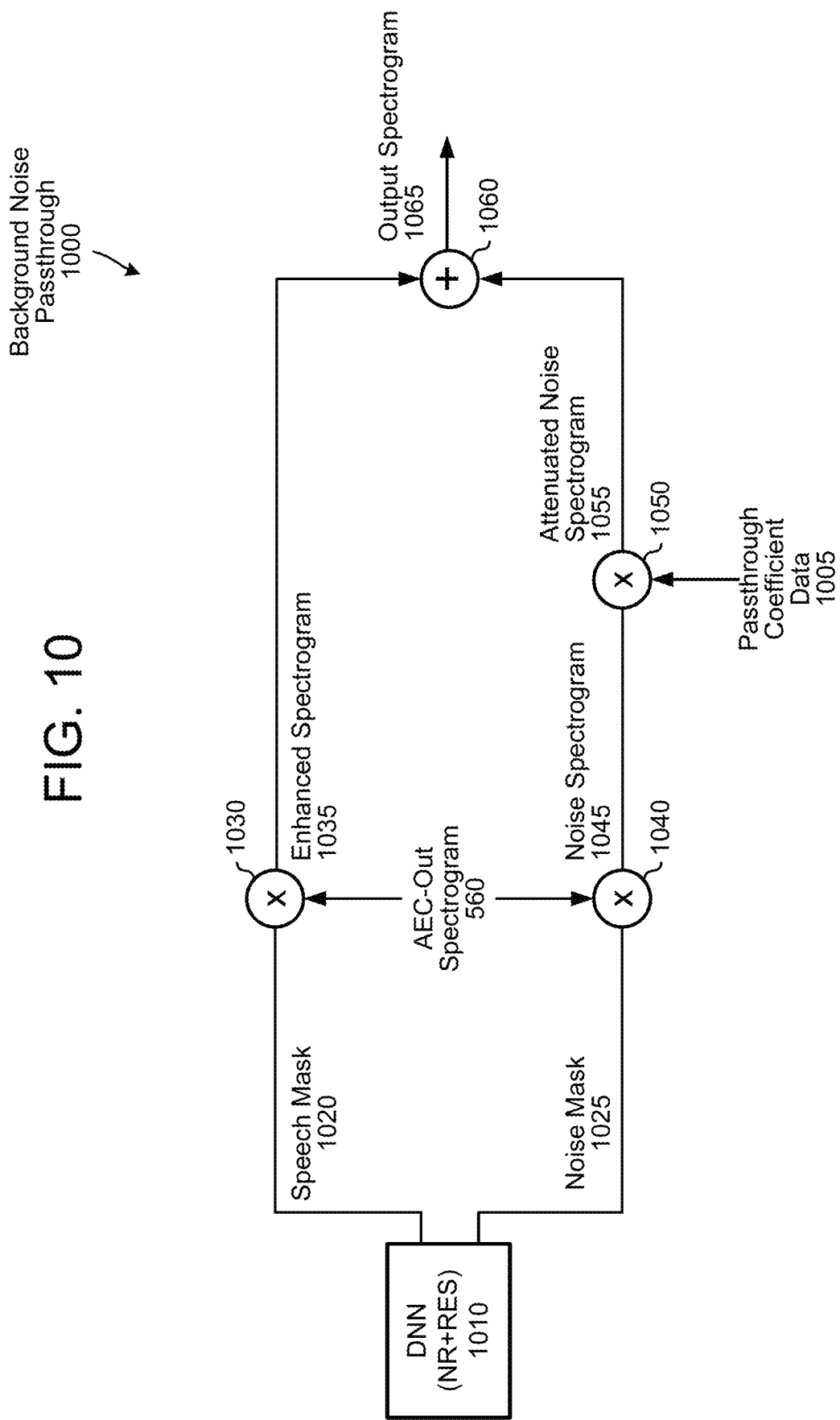
FIG. 10 illustrates an example component diagram for performing background noise passthrough according to embodiments of the present disclosure.

FIG. 10 illustrates an example component diagram for performing background noise passthrough according to embodiments of the present disclosure. In some examples, the device 110 may perform background noise passthrough 1000 in order to capture ambient sounds (e.g., background noise, environmental noise and/or the like) in an environment of the device 110. For example, during a communication session between the user 10 and a remote user, the user 10 may desire that the output audio data 335 capture target speech generated by the user 10 as part of a conversation. In addition, the user 10 may desire that the output audio data 335 capture other audible sounds, such as ambient noise and/or audible sounds generated by sound sources other than the user 10. For example, the user 10 may wish to share the environment with the remote user, enabling the remote user to listen to sounds of nature, a concert, family members or pets, and/or the like, although the disclosure is not limited thereto. Additionally or alternatively, the user 10 may be remote from the device 110 and may initiate a communication session with the device 110. As part of the communication session, the user 10 may desire that the output audio data 335 capture the environment, enabling the user 10 to listen to monitor the environment and hear ambient sounds, family members or pets, and/or the like.

As illustrated in FIG. 10, the device 110 may enable background noise passthrough 1000 using a DNN component 1010 configured to generate a speech mask 1020 (e.g., speech mask data) and a noise mask 1025 (e.g., noise mask data). In some examples the speech mask 1020 and/or the noise mask 1025 may correspond to complex spectrogram data, although the disclosure is not limited thereto. Similar to the output stage 550 described above, the device 110 may include a first combiner component 1030 configured to use the speech mask 1020 to generate an enhanced spectrogram 1035 (e.g., enhanced spectrogram data). For example, the first combiner component 1030 may combine the speech mask 1020 and the AEC-Out spectrogram 560 (e.g., AEC-Out real spectrogram 510 and AEC-Out imaginary spectrogram 512) to generate the enhanced spectrogram data (e.g., enhanced real spectrogram 570 and enhanced imaginary spectrogram 575), although the disclosure is not limited thereto.

In addition, the device 110 may include a second combiner component 1040 configured to use the noise mask 1025 to generate a noise spectrogram 1045 (e.g., noise spectrogram data). For example, the second combiner component 1030 may combine the noise mask 1025 and the AEC-Out spectrogram 560 (e.g., AEC-Out real spectrogram 510 and AEC-Out imaginary spectrogram 512) to generate noise spectrogram data (e.g., noise real spectrogram and noise imaginary spectrogram), although the disclosure is not limited thereto.

In some examples, the device 110 may use passthrough coefficient data 1005 to control an amount of environmental noise included in the output audio data 335. For example, the device 110 may include a third combiner component 1050 that may apply the passthrough coefficient data 1005 to the noise spectrogram 1045 to generate attenuated noise spectrogram 1055 (e.g., attenuated noise spectrogram data), with an amount of attenuation indicated by the passthrough coefficient data 1005.

In some examples, the passthrough coefficient data 1005 may correspond to a single value that is applied uniformly to each frequency index. For example, the passthrough coefficient data 1005 may indicate a percentage (e.g., 70%) and the third combiner component 1050 may pass 70% of the noise spectrogram 1045 (e.g., attenuate 30%). However, the disclosure is not limited thereto, and in other examples the passthrough coefficient data 1005 may vary based on frequency index. Thus, instead of being uniform across frequency index, the passthrough coefficient data 1005 may correspond to a vector that includes a plurality of passthrough coefficient values without departing from the disclosure. For example, the passthrough coefficient data 1005 may enable the device 110 to selectively pass certain frequency ranges associated with audible sounds of interest (e.g., speech, environmental noises, etc.) without departing from the disclosure.

As illustrated in FIG. 10, a fourth combiner component 1060 may combine the enhanced spectrogram 1035 and the attenuated noise spectrogram 1055 to generate an output spectrogram 1065 (e.g., output spectrogram data) representing the target speech and the desired environmental sounds. While not illustrated in FIG. 10, the device 110 may generate the output audio data 335 using the output spectrogram 1065.

Figure 11:
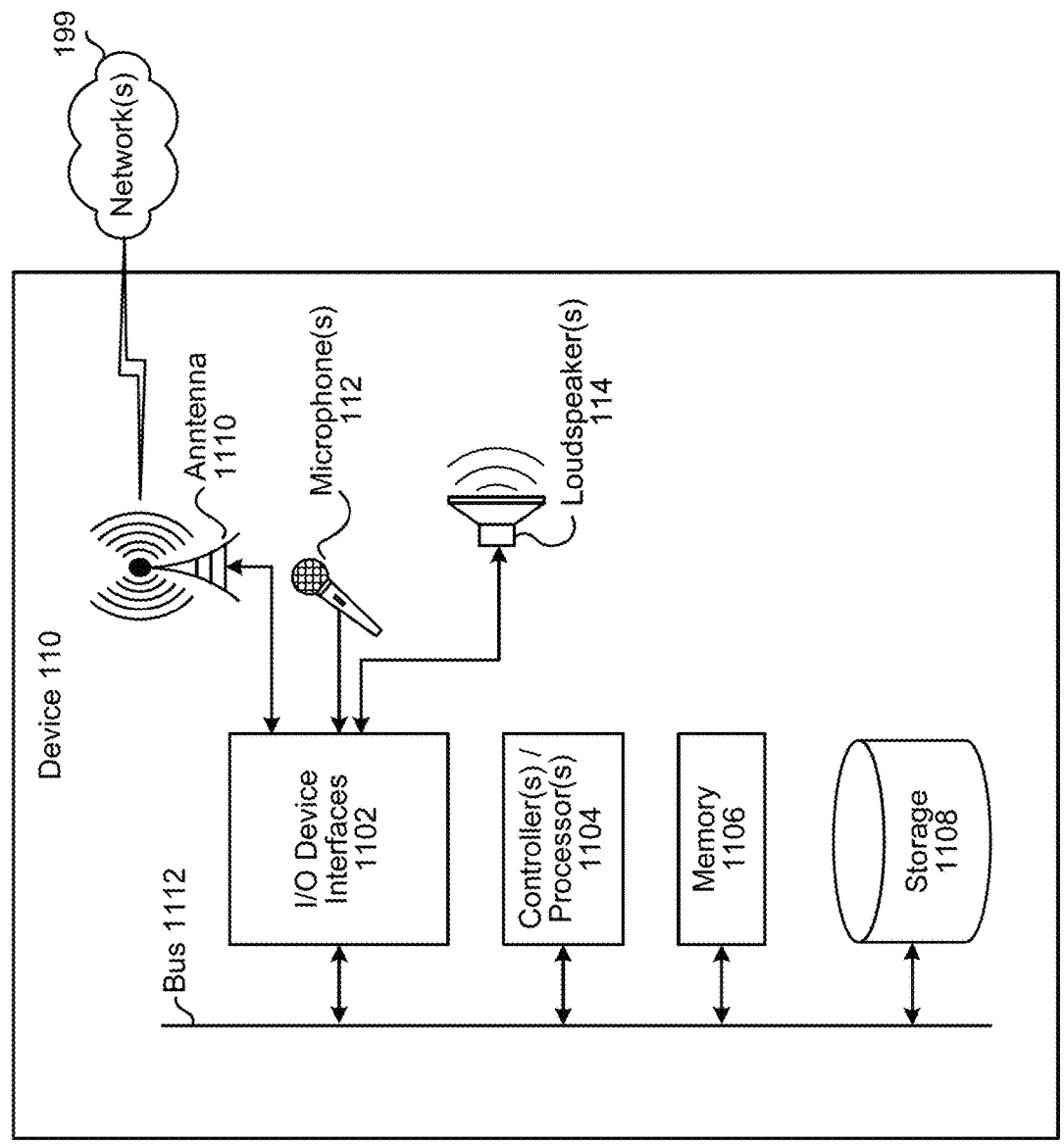
FIG. 11 is a block diagram conceptually illustrating example components of a system according to embodiments of the present disclosure.

FIG. 11 is a block diagram conceptually illustrating example components of the system 100. In operation, the system 100 may include computer-readable and computer-executable instructions that reside on the system, as will be discussed further below. The system 100 may include one or more audio capture device(s), such as microphones 112. The audio capture device(s) may be integrated into a single device or may be separate. The system 100 may also include an audio output device for producing sound, such as loudspeaker(s) 114. The audio output device may be integrated into a single device or may be separate. The system 100 may include an address/data bus 1112 for conveying data among components of the system 100. Each component within the system may also be directly connected to other components in addition to (or instead of) being connected to other components across the bus 1112.

The system 100 may include one or more controllers/processors 1104 that may each include a central processing unit (CPU) for processing data and computer-readable instructions, and a memory 1106 for storing data and instructions. The memory 1106 may include volatile random-access memory (RAM), non-volatile read only memory (ROM), non-volatile magnetoresistive (MRAM) and/or other types of memory. The system 100 may also include a data storage component 1108, for storing data and controller/processor-executable instructions (e.g., instructions to perform operations discussed herein). The data storage component 1108 may include one or more non-volatile storage types such as magnetic storage, optical storage, solid-state storage, etc. The system 100 may also be connected to removable or external non-volatile memory and/or storage (such as a removable memory card, memory key drive, networked storage, etc.) through the input/output device interfaces 1102.

Computer instructions for operating the system 100 and its various components may be executed by the controller(s)/processor(s) 1104, using the memory 1106 as temporary "working" storage at runtime. The computer instructions may be stored in a non-transitory manner in non-volatile memory 1106, storage 1108, and/or an external device. Alternatively, some or all of the executable instructions may be embedded in hardware or firmware in addition to or instead of software.

The system may include input/output device interfaces 1102. A variety of components may be connected through the input/output device interfaces 1102, such as the loudspeaker(s) 114, the microphone(s) 112, and a media source such as a digital media player (not illustrated). The input/output interfaces 1102 may include A/D converters (not shown) and/or D/A converters (not shown).

The input/output device interfaces 1102 may also include an interface for an external peripheral device connection such as universal serial bus (USB), FireWire, Thunderbolt or other connection protocol. The input/output device interfaces 1102 may also include a connection to one or more networks 199 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network(s) 199, the system 100 may be distributed across a networked environment.

As illustrated in FIG. 12, multiple devices (110a-110j, 20) may contain components of the system and the devices may be connected over a network(s) 199. The network(s) 199 may include a local or private network or may include a wide network such as the Internet. Devices may be connected to the network(s) 199 through either wired or wireless connections. For example, headphones 110a/110b, a smart phone 110c, a speech-detection device with display 110d, a speech-detection device 110e, a tablet computer 110f, an input/output (I/O) limited device 110g (e.g., a device such as a FireTV stick or the like), a display/smart television 110h, a motile device 110i, a vent-mountable device 110j (e.g., a device such as an Echo Auto or the like), and/or the like may be connected to the network(s) 199 through a wireless service provider, over a WiFi or cellular network connection, or the like. Other devices are included as network-connected support devices, such as the natural language command processing system associated with supporting device(s) 20 and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as an ASR component, an NLU component, etc. of the natural language command processing system associated with the supporting device(s) 20.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, wearable computing devices (watches, glasses, etc.), other mobile devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the fixed beamformer, acoustic echo canceller (AEC), adaptive noise canceller (ANC) unit, residual echo suppression (RES), double-talk detector, etc. may be implemented by a digital signal processor (DSP).

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving, by a device, first audio data corresponding to first audio generated by a loudspeaker;
   receiving second audio data corresponding to audio captured by at least one microphone of the device, the second audio data including a first representation of the first audio and a first representation of second audio, the second audio including speech;
   performing, using the first audio data and the second audio data, echo cancellation to generate third audio data and echo estimate data, wherein the echo estimate data is generated using the first audio data and at least one filter, and the third audio data includes a second representation of the second audio and a second representation of the first audio that is attenuated relative to the first representation of the first audio;
   generating first complex spectrogram data corresponding to the third audio data;
   generating, by a trained model using the first complex spectrogram data and the echo estimate data, second complex spectrogram data; and
   generating, using the second complex spectrogram data, fourth audio data representing the speech.

2. The computer-implemented method of claim 1, wherein the first complex spectrogram data includes a third representation of the first audio and a third representation of the second audio, and generating the second complex spectrogram data further comprises:
   generating speech mask data corresponding to the first complex spectrogram data; and
   generating, using the first complex spectrogram data and the speech mask data, the second complex spectrogram data, wherein the second complex spectrogram data includes a fourth representation of the first audio and a fourth representation of the second audio, the fourth representation of the first audio being attenuated relative to the third representation of the first audio.

3. The computer-implemented method of claim 1, wherein generating the second complex spectrogram data further comprises:
   generating third complex spectrogram data corresponding to the echo estimate data;
   processing, using the trained model, the first complex spectrogram data and the third complex spectrogram data to generate speech mask data; and
   generating, using the first complex spectrogram data and the speech mask data, the second complex spectrogram data.

4. The computer-implemented method of claim 1, wherein generating the second complex spectrogram data further comprises:
   generating first data representing a magnitude of the echo estimate data;
   processing, using the trained model, the first complex spectrogram data and the first data to generate speech mask data; and
   generating, using the first complex spectrogram data and the speech mask data, the second complex spectrogram data.

5. The computer-implemented method of claim 1, wherein generating the first complex spectrogram data further comprises:
   generating, using the third audio data, first spectrogram data and second spectrogram data, wherein the first spectrogram data represents real components of the third audio data and the second spectrogram data represents imaginary components of the third audio data, and
   generating the second complex spectrogram data further comprises generating, by the trained model, using the first spectrogram data and the second spectrogram data, first speech mask data and second speech mask data, wherein the first speech mask data represents real components of the speech and the second speech mask data represents imaginary components of the speech.

6. The computer-implemented method of claim 1, wherein generating the second complex spectrogram data further comprises:
   processing, using the trained model, the first complex spectrogram data and the echo estimate data to generate speech mask data; and
   generating, using the first complex spectrogram data and the speech mask data, the second complex spectrogram data,
   the method further comprises:
   processing, using the trained model, the first complex spectrogram data and the echo estimate data to generate noise mask data, and
   generating, using the first complex spectrogram data and the noise mask data, third complex spectrogram data representing environmental noise, wherein the fourth audio data is generated using the second complex spectrogram data and the third complex spectrogram data.

7. The computer-implemented method of claim 1, wherein generating the second complex spectrogram data further comprises:
   determining classification data indicating a classification type associated with the loudspeaker; and
   generating, by the trained model, the second complex spectrogram data using the first complex spectrogram data, the echo estimate data, the first audio data, and the classification data.

8. The computer-implemented method of claim 1, wherein generating the second complex spectrogram data further comprises:
   determining motion data indicating a speed associated with the device; and
   generating, by the trained model, the second complex spectrogram data using the first complex spectrogram data, the echo estimate data, and the motion data.

9. The computer-implemented method of claim 1, wherein the at least one filter generates the echo estimate data by using the first audio data to approximate a portion of the first audio that is represented in the second audio data.

10. The computer-implemented method of claim 1, wherein generating the second complex spectrogram data further comprises:
   determining state data indicating a current state associated with the device; and
   generating, by the trained model, the second complex spectrogram data using the first complex spectrogram data, the echo estimate data, and the state data.

11. A system comprising:
   at least one processor; and
   memory including instructions operable to be executed by the at least one processor to cause the system to:
      receive, by a device, first audio data corresponding to first audio generated by a loudspeaker;
      receive second audio data corresponding to audio captured by at least one microphone of the device, the second audio data including a first representation of the first audio and a first representation of second audio, the second audio including speech;
      perform, using the first audio data and the second audio data, echo cancellation to generate third audio data and echo estimate data, wherein the echo estimate data is generated using the first audio data and at least one filter, and the third audio data includes a second representation of the second audio and a second representation of the first audio that is attenuated relative to the first representation of the first audio;
      generate, by a trained model using the third audio data and the echo estimate data, speech mask data, wherein the trained model is configured to perform noise reduction and residual echo suppression processing; and
      generate, using the speech mask data and the third audio data, fourth audio data representing the speech.

12. The system of claim 11, wherein the memory further comprises instructions that, when executed by the at least one processor, further cause the system to:
   generate first complex spectrogram data corresponding to the third audio data;
   generate, by the trained model, using the first complex spectrogram data and the echo estimate data, the speech mask data;
   generate, using the first complex spectrogram data and the speech mask data, the fourth audio data; and
   generate, using the fourth audio data, fifth audio data representing the second audio.

13. The system of claim 11, wherein the memory further comprises instructions that, when executed by the at least one processor, further cause the system to:
   generate first complex spectrogram data corresponding to the third audio data;
   generate second complex spectrogram data corresponding to the echo estimate data; and
   process, using the trained model, the first complex spectrogram data and the second complex spectrogram data to generate the speech mask data.

14. The system of claim 11, wherein the memory further comprises instructions that, when executed by the at least one processor, further cause the system to:
   generate first complex spectrogram data corresponding to the third audio data;
   generate first data representing a magnitude of the echo estimate data; and
   process, using the trained model, the first complex spectrogram data and the first data to generate the speech mask data.

15. The system of claim 11, wherein the memory further comprises instructions that, when executed by the at least one processor, further cause the system to:
   generate, using the third audio data, first spectrogram data and second spectrogram data, wherein the first spectrogram data represents real components of the third audio data and the second spectrogram data represents imaginary components of the third audio data, and
   generate, by the trained model, using the first spectrogram data and the second spectrogram data, first speech mask data and second speech mask data, wherein the first speech mask data represents real components of the speech and the second speech mask data represents imaginary components of the speech.

16. The system of claim 11, wherein the memory further comprises instructions that, when executed by the at least one processor, further cause the system to:
   process, using the trained model, the third audio data and the echo estimate data to generate noise mask data;
   generate, using the third audio data and the noise mask data, second data representing environmental noise; and
   generate fifth audio data using the fourth audio data and the second data, the fifth audio data including a third representation of the second audio and a representation of the environmental noise.

17. The system of claim 11, wherein the memory further comprises instructions that, when executed by the at least one processor, further cause the system to:
   generate first complex spectrogram data corresponding to the third audio data;
   determine classification data indicating a classification type associated with the loudspeaker; and
   generate, by the trained model, second complex spectrogram data using the first complex spectrogram data, the echo estimate data, the first audio data, and the classification data.

18. The system of claim 11, wherein the memory further comprises instructions that, when executed by the at least one processor, further cause the system to:
   generate first complex spectrogram data corresponding to the third audio data;
   determine motion data indicating a speed associated with the device; and
   generate, by the trained model, second complex spectrogram data using the first complex spectrogram data, the echo estimate data, and the motion data.

19. A computer-implemented method, the method comprising:
   determining, by a device, first audio data corresponding to first audio generated by a first loudspeaker;
   receiving second audio data corresponding to audio captured by at least one microphone of the device, the second audio data including a first representation of the first audio and a first representation of second audio, the second audio including speech;
   performing, using the first audio data and the second audio data, echo cancellation to generate third audio data and echo estimate data, wherein the echo estimate data is generated using the first audio data and at least one filter, and the third audio data includes a second representation of the second audio and a second representation of the first audio that is attenuated relative to the first representation of the first audio;
   generating, by a trained model using the third audio data and the echo estimate data, fourth audio data representing the second audio; and generating, using the fourth audio data, fifth audio data representing the speech.

20. The computer-implemented method of claim 19, further comprising:
receiving, by a device, sixth audio data corresponding to media content;
generating, using the sixth audio data, the first audio data;
sending a first portion of the first audio data to the first loudspeaker to generate the first audio; and
sending a second portion of the first audio data to a second loudspeaker to generate third audio associated with the media content.

* * * * *